United States Patent
Kurita et al.

(10) Patent No.: US 11,924,082 B2
(45) Date of Patent: Mar. 5, 2024

(54) CONTROL DEVICE AND CONTROL METHOD

(71) Applicant: Nippon Telegraph and Telephone Corporation, Tokyo (JP)

(72) Inventors: Kaori Kurita, Musashino (JP); Hiroki Iwahashi, Musashino (JP); Hidetaka Nishihara, Musashino (JP); Kazuhiro Matsuo, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 456 days.

(21) Appl. No.: 17/270,529

(22) PCT Filed: Aug. 13, 2019

(86) PCT No.: PCT/JP2019/031873
§ 371 (c)(1),
(2) Date: Feb. 23, 2021

(87) PCT Pub. No.: WO2020/040006
PCT Pub. Date: Feb. 27, 2020

(65) Prior Publication Data
US 2021/0351998 A1 Nov. 11, 2021

(30) Foreign Application Priority Data
Aug. 24, 2018 (JP) .................. 2018-156878

(51) Int. Cl.
*H04L 43/062* (2022.01)
*H04L 43/0888* (2022.01)
*H04L 43/16* (2022.01)

(52) U.S. Cl.
CPC ........ *H04L 43/0888* (2013.01); *H04L 43/062* (2013.01); *H04L 43/16* (2013.01)

(58) Field of Classification Search
CPC ... H04L 43/0888; H04L 43/062; H04L 43/16; H04L 41/0894; H04L 41/142;
(Continued)

(56) References Cited

U.S. PATENT DOCUMENTS 7,324,553 B1 * 1/2008 Varier .................. H04L 45/70
370/395.2
2009/0238207 A1 * 9/2009 Zhao ................... H04W 28/22
455/452.2
(Continued)

FOREIGN PATENT DOCUMENTS

JP      H0413389      1/1992
JP      2010-108283   5/2010
(Continued)

OTHER PUBLICATIONS

[No Author Listed], "3GPP TS 23.203 V15.0.0—3rd Generation Partnership Project; Technical Specification Group Services and System Aspects; Policy and charging control architecture (Release 15)," 3GPP a Global Initiative, Sep. 2017, 257 pages.
(Continued)

*Primary Examiner* — Sithu Ko
*Assistant Examiner* — Malick A Sohrab
(74) *Attorney, Agent, or Firm* — Fish & Richardson P.C.

(57) ABSTRACT

A policy control device includes an acquisition unit configured to acquire an amount of communication of an accommodated user terminal from a relay device that notifies the amount of communication when the amount of communication exceeds a communication amount threshold value, a calculation unit configured to calculate a communication speed by using an amount of communication in a past fixed period of time including at least the amount of communication currently acquired by the acquisition unit, and calculate the communication amount threshold value based on the
(Continued)

calculated communication speed, and a notification unit configured to notify the relay device of the communication amount threshold value calculated by the calculation unit.

8 Claims, 23 Drawing Sheets

(58) Field of Classification Search
CPC ..... H04L 41/147; H04L 41/149; H04L 43/06; H04L 12/28; H04L 43/0876
See application file for complete search history.

(56) References Cited

U.S. PATENT DOCUMENTS

| | | | |
|---|---|---|---|
| 2011/0211465 A1* | 9/2011 | Farrugia | H04M 15/8016 370/252 |
| 2012/0224538 A1* | 9/2012 | Stenfelt | H04L 12/1407 370/328 |
| 2014/0064072 A1* | 3/2014 | Ludwig | H04L 47/2483 370/230 |
| 2015/0222515 A1 | 8/2015 | Mimura et al. | |
| 2016/0191360 A1 | 6/2016 | Onoue | |

FOREIGN PATENT DOCUMENTS

| | | |
|---|---|---|
| JP | 2010-206577 | 9/2010 |
| JP | 2012-58907 | 3/2012 |
| JP | 5314605 | 10/2013 |
| JP | 2014-155096 | 8/2014 |
| JP | 2015-149578 | 8/2015 |
| JP | 2016-127390 | 7/2016 |
| JP | 2017-195473 | 10/2017 |

OTHER PUBLICATIONS

[No Author Listed], "ETSI TS 129 212 V14.6.0 Release 14—Universal Mobile Telecommunications System (UMTS); LTE; Policy and Charging Control (PCC); Reference points," 3GPP a Global Initiative, Jan. 2018, 288 pages.

Soumu.go.jp, [online], "Aggregation and trial calculation of traffic on Japan's Internet (announcement of aggregated results in Nov. 2017)," 2017, retrieved on Jun. 27, 2018, 5 pages (with English Translation).

* cited by examiner

| USER IDENTIFIER | TIME | AMOUNT OF COMMUNICATION | | |
|---|---|---|---|---|
| | | UPLINK | DOWNLINK | TOTAL AMOUNT |
| Xxxx | 2018/5/29 19:51:00 | 300 M | 1500 M | 1800 M |
| Yyyy | 2018/6/23 05:20:22 | 500 M | 5000 M | 5800 M |
| ... | ... | ... | ... | ... |

| USER IDENTIFIER | PERIOD | COMMUNICATION SPEED [bpm] | | |
|---|---|---|---|---|
| | | UPLINK | DOWNLINK | TOTAL AMOUNT |
| Xxxx | 2018/5/29 19:00-20:00 | 500 M | 1000 M | 1500 M |
| Xxxx | 2018/5/29 20:00-21:00 | 500 M | 1500 M | 2000 M |
| ... | ... | ... | ... | ... |

Fig. 6

CONTROL DEVICE AND CONTROL METHOD

CROSS-REFERENCE TO RELATED APPLICATIONS

This application is a National Stage application under 35 U.S.C. § 371 of International Application No. PCT/JP2019/031873, having an International Filing Date of Aug. 13, 2019, which claims priority to Japanese Application Serial No. 2018-156878, filed on Aug. 24, 2018. The disclosure of the prior application is considered part of the disclosure of this application, and is incorporated in its entirety into this application.

TECHNICAL FIELD

The present disclosure relates to a control device and a control method.

BACKGROUND ART

Traffic flowing through communication infrastructures has been increased due to popularization of mobile terminals and expansion of use of online video delivery and cloud services. To cope with this increase in traffic volume, a policy control technology is applied to a network, and the traffic is controlled for each user terminal.

In the policy control technology, control policies such as a communication bandwidth, a priority class, the amount of communication, routing, or shutdown are controlled for each user terminal or each application with reference to the contents of each packet. For example, a policy control device that manages control policies acquires the amounts of communication of user terminals from a router accommodating the user terminals, and transmits, to a relay device (for example, a router), a control policy for limiting a communication bandwidth of a user terminal with a large amount of communication. The router limits the communication bandwidth of the target user terminal according to the received control policy.

As a scheme for a policy control device to acquire the amount of communication, a scheme based on a time and a scheme based on the amount of communication are defined in the 3rd Generation Partnership Project (3GPP) (see Non Patent Literatures 1 and 2). In the scheme based on a time, the router notifies the policy control device of the amount of communication when a fixed time elapses.

Meanwhile, in the scheme based on the amount of communication, when the amount of communication of each user terminal exceeds a communication amount threshold value specified by the policy control device, the router notifies the policy control device of the amount of communication. Here, the amount of communication of the user terminal varies depending on a time slot (see Non Patent Literature 3).

The number of signals that can be processed by the policy control device per unit time is limited, and thus, it is necessary to suppress the number of signals transmitted from the router to the policy control device. Thus, a scheme has been proposed in which, instead of the policy control device, the router manages the amount of communication of each user terminal and determines the control policy to be employed, thereby suppressing the number of signals transmitted from the router to the policy control device (see Patent Literature 1). However, this scheme is not defined as a standard operation of the 3GPP.

A scheme for suppressing and notifying the number of signals at an appropriate time has also been proposed (see Patent Literature 2). This scheme exerts an improvement effect of acquiring, at an appropriate time, statistical information in a time slot in which the amount of communication increases.

CITATION LIST

Patent Literature

Patent Literature 1: JP 2014-155096 A
Patent Literature 2: JP 2017-195473 A

Non Patent Literature

Non Patent Literature 1: "3GPP TS23.203 ver.15.0.0", [online], [searched on Aug. 16, 2018], Internet <URL: http://www.3gpp.org/ftp//Specs/archive/23_series/23.203/23203-f00.zip>
Non Patent Literature 2: "3GPP TS29.212 ver.14.6.0 Release 14", [online], [searched on Aug. 16, 2018]; Internet <URL: http://www.etsi.org/deliver/etsi_ts/129200_129299/129212/14.06.00_60/ts_129212v140600p.pdf>
Non Patent Literature 3: "Aggregation and Provisional Calculation of Internet traffic in Japan," published on November 2017)", [online], [searched on Aug. 16, 2018], Internet <URL: http://www.soumu.go.jp/menu_news/s-news/02kiban04_04000225.html>

SUMMARY OF THE INVENTION

Technical Problem

FIG. 27 is a graph illustrating a time dependence of the amount of communication. Of the schemes for acquiring the amount of communication defined in the 3GPP, traffic cannot be controlled by the scheme based on a time because the policy control device transmits the control policy to the router only at fixed intervals (see (1) of FIG. 27). In the scheme described in Patent Literature 2, the number of times of notifying a signal amount is also greatly reduced in a time slot in which the amount of user communication decreases, that is, in a time slot in which the amount of communication greatly decreases. Thus, the immediacy lacks as in the schemes described in Non Patent Literatures 1 and 2.

Meanwhile, according to the scheme based on a communication amount, the amount of communication of each user terminal varies depending on the time slot. Thus, the number of times of notifying the amount of communication to the policy control device from the router increases in a time slot in which the traffic of each user terminal is concentrated, which results in an increase in the number of signals (see (2) of FIG. 27).

The present disclosure has been made in view of the aforementioned circumstances, and an object of the present disclosure is to acquire an appropriate number of notification signals from a relay device that notifies the amount of communication of each user terminal regardless of an increase or decrease in the amount of communication of the user terminal.

Means for Solving the Problem

In order to solve the aforementioned problems and to achieve the object, a control device according to the present disclosure includes an acquisition unit configured to acquire an amount of communication of an accommodated user terminal from a relay device that notifies the amount of communication when the amount of communication exceeds a communication amount threshold value, a calculation unit configured to calculate a communication speed by using an amount of communication in a past fixed period of time including at least the amount of communication currently acquired by the acquisition unit, and calculate the communication amount threshold value based on the calculated communication speed, and a notification unit configured to notify the relay device of the communication amount threshold value calculated by the calculation unit.

Effects of the Invention

According to the present disclosure, it is possible to acquire an appropriate number of notification signals from a relay device that notifies the amount of communication of each user terminal regardless of an increase or decrease in the amount of communication of the user terminal.

BRIEF DESCRIPTION OF DRAWINGS

FIG. 6 is a diagram illustrating a data configuration of a communication speed table.

DESCRIPTION OF EMBODIMENTS

Hereinafter, embodiments of the present disclosure will be described in detail with reference to the drawings. The present disclosure is not limited to the embodiments. In the description of the drawings, the identical parts are denoted by the same reference signs.

Embodiment

System Configuration

Figure 1:
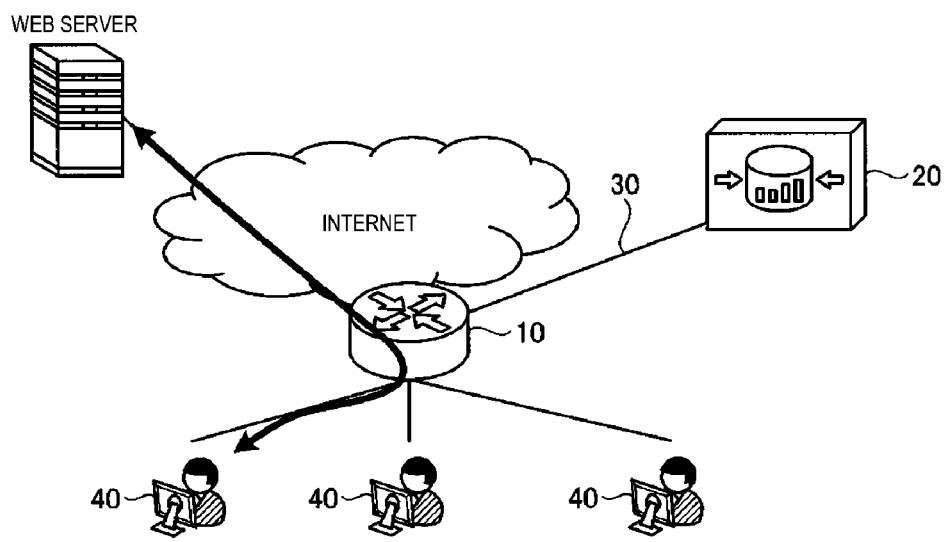
FIG. 1 is a diagram illustrating a schematic configuration of a communication system according to a first embodiment.

FIG. 1 is a diagram illustrating a schematic configuration of a communication system according to a first embodiment. As illustrated in FIG. 1, the communication system according to the first embodiment includes a relay device 10 and a policy control device 20 (control device), and these devices are communicatively connected to each other via an electrical communication line 30 such as a local area network (LAN) or the Internet.

The relay device 10 accommodates user terminals 40 used by users using Web services. This relay device 10 has a policy and charging enforcement function (PCEF). The relay device 10 measures the amount of communication of each user terminal 40 accessing a Web server through the Internet, and notifies the policy control device 20 of the amount of communication when the amount of communication exceeds a communication amount threshold value notified from the policy control device 20. The relay device 10 controls traffic of each user terminal 40 according to a control policy notified from the policy control device 20 depending on the amount of communication.

The policy control device 20 has a policy and charging rules function (PCRF), and manages a control policy for controlling the traffic of each user terminal 40. The policy control device 20 determines a control policy corresponding to the amount of communication of each user terminal 40 notified from the relay device 10, and notifies the relay device 10 of the determined control policy. The policy control device 20 calculates a communication amount threshold value, notifies the relay device 10 of the calculated communication amount threshold value, and acquires the amount of communication notified from the relay device 10 when the amount of communication of each user terminal 40 exceeds the communication amount threshold value.

Configuration of Relay Device

Figures 2, 3:
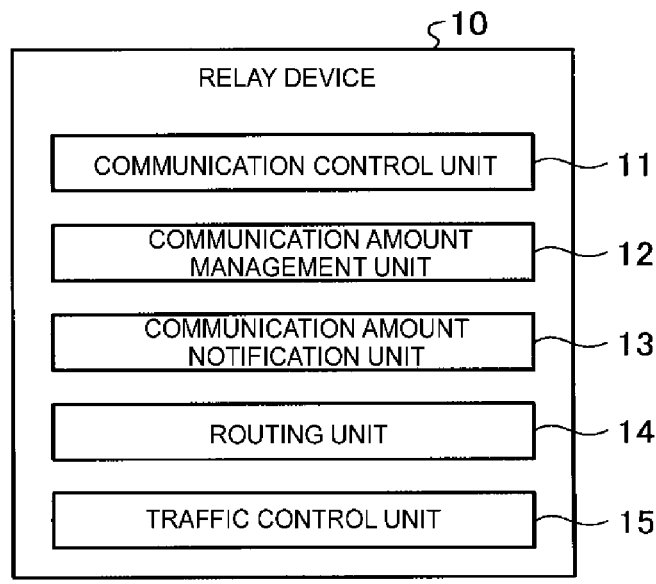
FIG. 2 is a schematic diagram illustrating a schematic configuration of a relay device illustrated in FIG. 1.
FIG. 3 is a diagram illustrating a data configuration of the amount of communication retained in a memory of the relay device illustrated in FIG. 2.

Next, a configuration of the relay device 10 will be described. FIG. 2 is a schematic diagram illustrating a schematic configuration of the relay device 10 illustrated in FIG. 1. As illustrated in FIG. 2, the relay device 10 includes a communication control unit 11, a communication amount management unit 12, a communication amount notification unit 13, a routing unit 14, and a traffic control unit 15.

The communication control unit 11 is achieved by a network interface card (NIC), or the like, and controls communication with an external device such as the policy control device 20 or each user terminal 40 via an electrical communication line such as a LAN or the Internet.

The communication amount management unit 12, the communication amount notification unit 13, the routing unit 14, and the traffic control unit 15 are achieved by using an electronic circuit such as a central processing unit (CPU) or by an integrated circuit such as an application specific integrated circuit (ASIC).

The communication amount management unit 12 measures the amount of communication of each user terminal 40, and retains the measured amount of communication in a memory (not illustrated). That is, the communication amount management unit 12 measures the amount of communication by accumulating, in the memory, the packet sizes of packets received from each user terminal 40 via the communication control unit 11.

FIG. 3 is a diagram illustrating a data configuration of the amount of communication retained in the memory of the relay device 10 illustrated in FIG. 2. As illustrated in FIG. 3, an uplink, a downlink, and a total amount of communication are retained for each user identifier identifying each user terminal 40. Here, the "uplink" means traffic from each user terminal 40 to the inside of the network. The "downlink" means traffic from the inside of the network to each user terminal 40. The total amount means the total amount of communication in the uplink and the downlink. For example, regarding the user terminal 40 of "Xxxx", FIG. 3 illustrates that the amount of communication in the uplink is 300 M, that the amount of communication in the downlink is 1500 M, and that the total amount of communication in the uplink and the downlink is 1800 M.

When the amount of communication of the user terminal 40 being measured exceeds "a communication amount threshold value received by the communication amount notification unit 13", the communication amount management unit 12 notifies the communication amount notification unit 13 of the amount of communication. The communication amount threshold value will be described later. When the amount of communication is notified, the communication amount management unit 12 resets the total amount of communication accumulated in the memory to zero.

The communication amount notification unit 13 receives the communication amount threshold value and a control policy described below from the policy control device 20 via the communication control unit 11. When the amount of communication is notified from the communication amount management unit 12, the communication amount notification unit 13 notifies the policy control device 20 of the amount of communication via the communication control unit 11.

When a packet from each user terminal 40 is received via the communication control unit 11, the routing unit 14 determines a next hop while referring to a destination IP address, and transmits the packet to the determined next hop.

The traffic control unit 15 controls the traffic of packets transmitted and received to and from each user terminal 40 via the communication control unit 11 according to the control policy received by the communication amount management unit 12.

Configuration of Policy Control Device

Figures 4, 5:
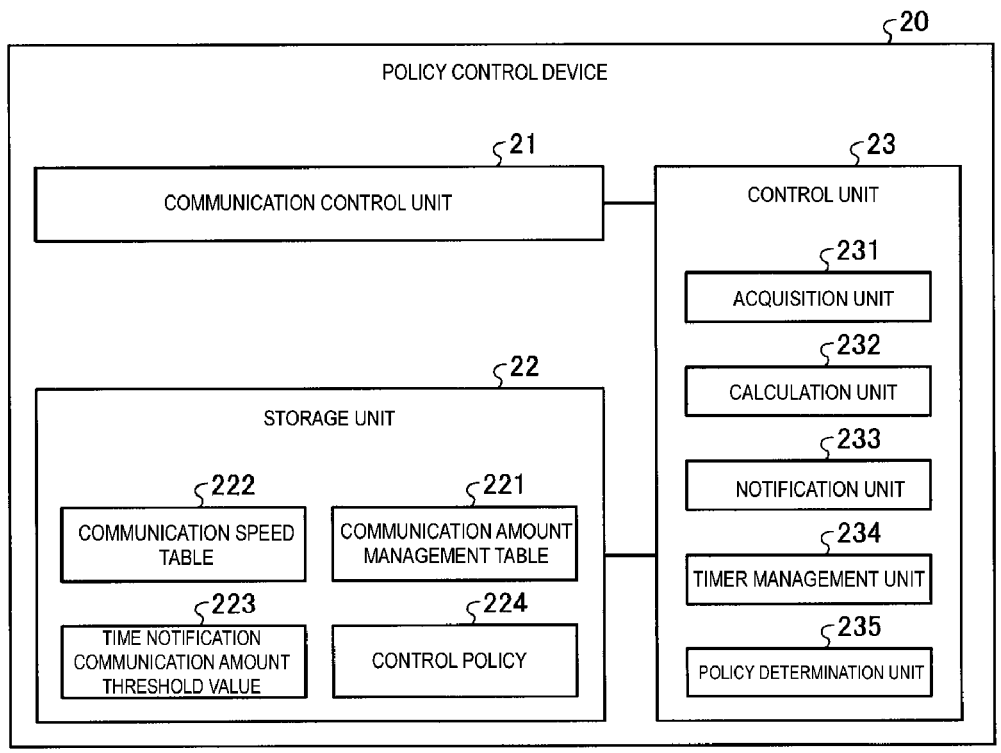
FIG. 4 is a diagram illustrating a schematic configuration of a policy control device according to an embodiment.
FIG. 5 is a diagram illustrating a data configuration of a communication amount management table.

Next, a configuration of the policy control device will be described. FIG. 4 is a diagram illustrating a schematic configuration of the policy control device 20 according to the embodiment. The policy control device 20 determines a control policy corresponding to the amount of communication of each user terminal 40 notified from the relay device 10, and notifies the relay device 10 of the determined control policy. The policy control device 20 executes notification processing described below to calculate a communication amount threshold value and notify the relay device 10, and acquires the amount of communication notified from the relay device 10 when the amount of communication of each user terminal 40 exceeds the communication amount threshold value. As illustrated in FIG. 4, the policy control device 20 includes a communication control unit 21, a storage unit 22, and a control unit 23.

The communication control unit 21 is achieved by a NIC or the like, and controls communication between the control unit 23 and an external device such as the relay device 10 via an electrical communication line such as a LAN or the Internet.

The storage unit 22 is achieved by a random access memory (RAM), a semiconductor memory element such as a flash memory, or a storage device such as a hard disk and an optical disc. The storage unit 22 may be configured to communicate with the control unit 23 via the communication control unit 21. The storage unit 22 stores a communication amount management table 221, a communication speed table 222, a time notification communication amount threshold value 223, and a control policy 224.

The communication amount management table 221 stores the amount of communication of each user terminal 40 at each time. FIG. 5 is a diagram illustrating a data configuration of the communication amount management table 221. As illustrated in FIG. 5, the communication amount management table 221 includes a user identifier identifying the user terminal 40, a time, and the amount of communication. Data notified from the relay device 10 is registered as the user identifier and the amount of communication (see FIG. 3). The time means a time at which the amount of communication is notified from the relay device 10. This time is equal to a time at which an acquisition unit 231 described below acquires the amount of communication from the relay device 10.

For example, FIG. 5 illustrates that, data regarding the amount of communication of the user terminal 40 of "Xxxx", which indicates that the amount of communication in the uplink is 300 M, that the amount of communication in the downlink is 1500 M, and that the total amount is 1800 M, is notified from the relay device 10 at 19:51:00 on May 29, 2018.

The communication speed table 222 stores a communication speed of each user terminal in each period. FIG. 6 is a diagram illustrating a data configuration of the communication speed table 222. As illustrated in FIG. 6, the communication speed table 222 includes a user identifier identifying the user terminal 40, a period, and a communication speed. The period means a notification period of the amount of communication from the relay device 10. The communication speed includes communication speeds in the uplink and the downlink, and also includes a total amount of the communication speeds.

For example, FIG. 6 illustrates that the user terminal 40 of "Xxxx" has a communication speed of 500 M[bps] in the uplink, a communication speed of 1000 M[bps] in the downlink, and a total amount of 1500 M[bps] in a period of from 19:00 to 20:00 on May 29, 2018.

The time notification communication amount threshold value 223 is the amount of communication estimated to be notified at intervals by the scheme based on a time. That is, the time notification communication amount threshold value 223 is a second threshold value X which is the amount of communication when the notification amount of communication is notified at fixed intervals, and is set in advance for each period such that a predetermined number of notification signals can be received at each time. For example, in the case of the time notification communication amount threshold value, when 2700 user terminals 40 are accommodated in the relay device 10 subordinate to the policy control device 20, the amount of communication with which 2700 notification signals per hour can be received is set as the second threshold value in each period based on the traffic of the user terminals 40.

The control policy 224 indicates the content of traffic control such as a communication bandwidth, a priority class, the amount of communication, routing, or shutdown. The control policy 224 corresponding to the amount of communication of each user terminal 40 is determined, and is notified to the relay device 10. The relay device 10 controls the traffic of each user terminal 40 according to the control policy 224.

The control unit 23 is achieved by using a CPU or the like, and functions as the acquisition unit 231, a calculation unit 232, a notification unit 233, a timer management unit 234, and a policy determination unit 235 as illustrated in FIG. 4 by executing a processing program stored in the memory.

When the amount of communication of each user terminal 40 accommodated in the relay device 10 exceeds the communication amount threshold value, the acquisition unit 231 acquires the amount of communication from the relay device 10 that notifies the amount of communication. Specifically, the acquisition unit 231 acquires the data regarding the amount of communication notified from the relay device 10 (see FIG. 3) via the communication control unit 21, and stores the data in the communication amount management table 221.

The calculation unit 232 calculates the communication amount threshold value based on the amount of communication in a past fixed period of time including the amount of communication currently acquired by the acquisition unit 231. Specifically, the calculation unit 232 calculates a communication speed indicating a change in the amount of communication per unit time by using the currently acquired amount of communication and a notification interval from a time at which the previous amount of communication is acquired to a time at which the current amount of communication is acquired. In other words, the calculation unit 232 calculates the communication speed in the latest one period. The calculation unit 232 obtains a first threshold value Y which is a multiplication value of the communication speed and a target value of a notification period the amount of communication of which is notified from the relay device 10.

The calculation unit 232 sets, as the communication amount threshold value, a smaller threshold value of the obtained first threshold value Y and the second threshold value X which is the amount of communication when the notification amount of communication is notified at fixed intervals. In other words, the calculation unit 232 sets, as the communication amount threshold value, a smaller threshold value of the multiplication value of the communication speed and the target value of the notification period and the time notification communication amount threshold value 223.

The notification unit 233 notifies the relay device 10 of the communication amount threshold value calculated by the calculation unit 232. As described above, when the amount of communication of a user terminal 40 being measured exceeds the notified communication amount threshold value of the user terminal 40, the relay device 10 notifies the policy control device 20 of the amount of communication of the user terminal 40. Accordingly, the policy control device 20 can receive a signal notifying the amount of communication at intervals so as not to exceed the processing performance of the policy control device 20.

When the amount of communication is not notified from the relay device 10 even after the communication amount threshold value is notified and then a target notification period elapses, the timer management unit 234 sets the communication amount threshold value to be notified to the relay device 10 to zero. The target notification period is a target value of the notification period from the current notification to the next notification.

Specifically, when the communication amount threshold value is notified to the relay device 10, the timer management unit 234 sets a timer for a target notification period T+β to monitor notification of the amount of communication from the relay device 10. Here, β indicates an additional time defined based on service requirements.

When the timer expires, the timer management unit 234 sets the communication amount threshold value to zero, and notifies the notification unit 233. For example, it is conceivable that a rate of a change in the amount of communication of the user terminal 40 decreases and the amount of communication does not exceed the communication amount threshold value even when the timer expires. In this case, the communication amount threshold value is updated to zero, the relay device 10 immediately notifies the policy control device 20 of the amount of communication. Accordingly, the policy control device 20 can acquire the amount of communication of the user terminal 40 by push notification.

The policy control device 20 recalculates the communication amount threshold value using the amount of communication acquired by the push notification, thereby flexibly coping with a rate of a change in a traffic volume, calculating the communication amount threshold value, and determining a control policy 224 to be employed.

The policy determination unit 235 determines a control policy to be employed for each user terminal 40 depending on the amount of communication of the user terminal 40 notified from the relay device 10 while referring to the control policy 224, and notifies the relay device 10 via the communication control unit 21.

Processing of Calculation Unit

Figure 7:
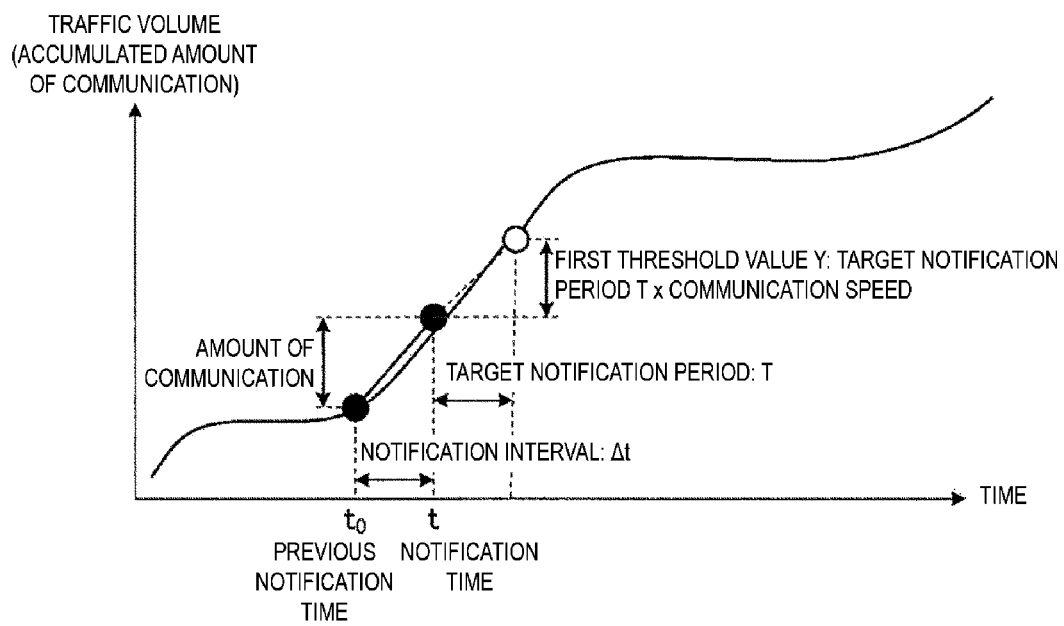
FIG. 7 is a graph illustrating a state in which a traffic volume of a certain user terminal changes over time.

Next, processing of calculating the communication amount threshold value by the calculation unit 232 illustrated in FIG. 4 will be described. FIG. 7 is a graph illustrating a state in which a traffic volume of a certain user terminal 40 changes over time. The traffic volume means the accumulated amount of communication obtained by accumulating the amount of communication after a measurement for the user terminal 40 starts.

First, calculation of the first threshold value Y will be described. When the amount of communication is notified at a time t from the relay device 10, a time period from a previous notification time to of the amount of communication to the current notification time t, that is, a notification interval is defined as Δt, a communication speed s indicating a change in the amount of communication per unit time is calculated by dividing the amount of communication notified at the time t by Δt.

By using the calculated communication speed s, an increment in the amount of communication or the traffic volume at a time of the next notification is predicted to be a communication speed s×the notification interval Δt. Thus, the calculation unit 232 defines a target value of the notification period from the current notification at the time t to the next notification as a target notification period T set depending on the processing performance of the policy control device 20, and calculates a first threshold value Y such that the amount of communication to be notified at a time of the next notification is equal to a predicted value of the amount of communication. That is, the first threshold value Y indicates a predicted value of the amount of communication at a point of time at which the target notification period T elapses from the time t, and can be expressed by Equation (1).

[Math. 1]

$$Y = T \times s \qquad (1)$$

As described above, the target notification period T is set depending on the processing performance of the policy control device 20. For example, the target notification period T is calculated by dividing the number of Gx sessions of all the user terminals 40 by the processing performance. Here, the Gx session means a session for transmitting the control policy 224 established between the policy control device 20 and the relay device 10.

Subsequently, the calculation unit 232 refers to a second threshold value X of the time notification communication amount threshold value 223 of the storage unit 22. A smaller threshold value of the first threshold value Y and the second threshold value X is set as the communication amount threshold value.

Figure 8:
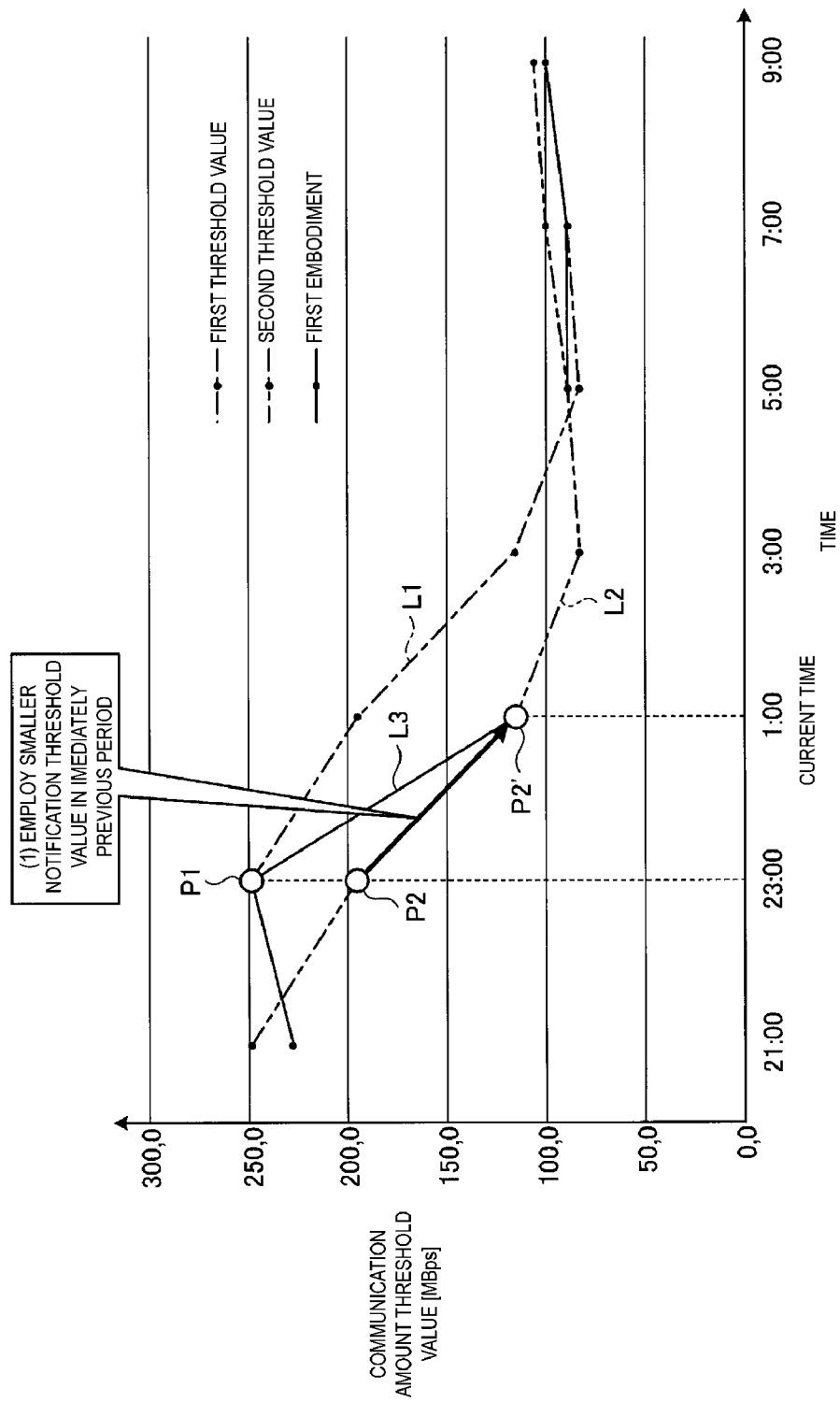
FIG. 8 is a graph illustrating a time dependence of a communication amount threshold value set by the policy control device illustrated in FIG. 1.

FIG. 8 is a graph illustrating a time dependence of the communication amount threshold value set by the policy control device 20 illustrated in FIG. 1. A curve L1 depicted in FIG. 8 corresponds to the first threshold value Y, a curve L2 corresponds to the second threshold value X, and a curve L3 corresponds to the communication amount threshold value set by the method of the present first embodiment.

The policy control device 20 compares the first threshold value Y calculated in the immediately previous period (from 23:00 to 1:00) (see a point P1 of FIG. 2) with the second threshold value X set in advance (see a point P2 of FIG. 2), and also employs the second threshold value X having a smaller value as the communication amount threshold value for the relay device 10 in the next period (see (1) of FIG. 8). In the example of FIG. 8, in the current period (from 1:00 to 3:00), the policy control device 20 employs the second threshold value X (see a point P2' of FIG. 2) of the current period.

Figure 9:
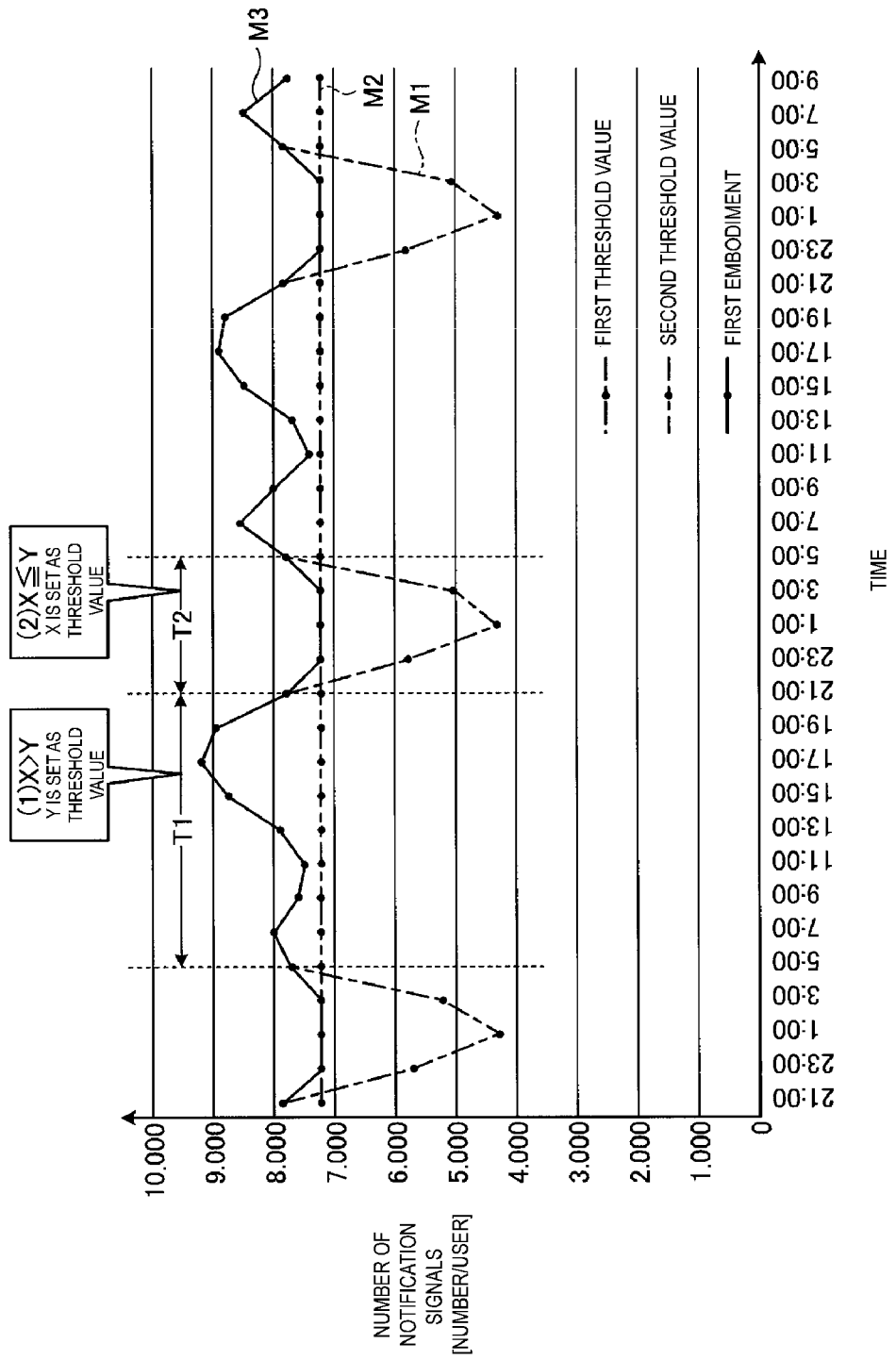
FIG. 9 is a graph illustrating a time dependence of the number of notification signals from the relay device when each communication amount threshold value is employed.
Figure 10:
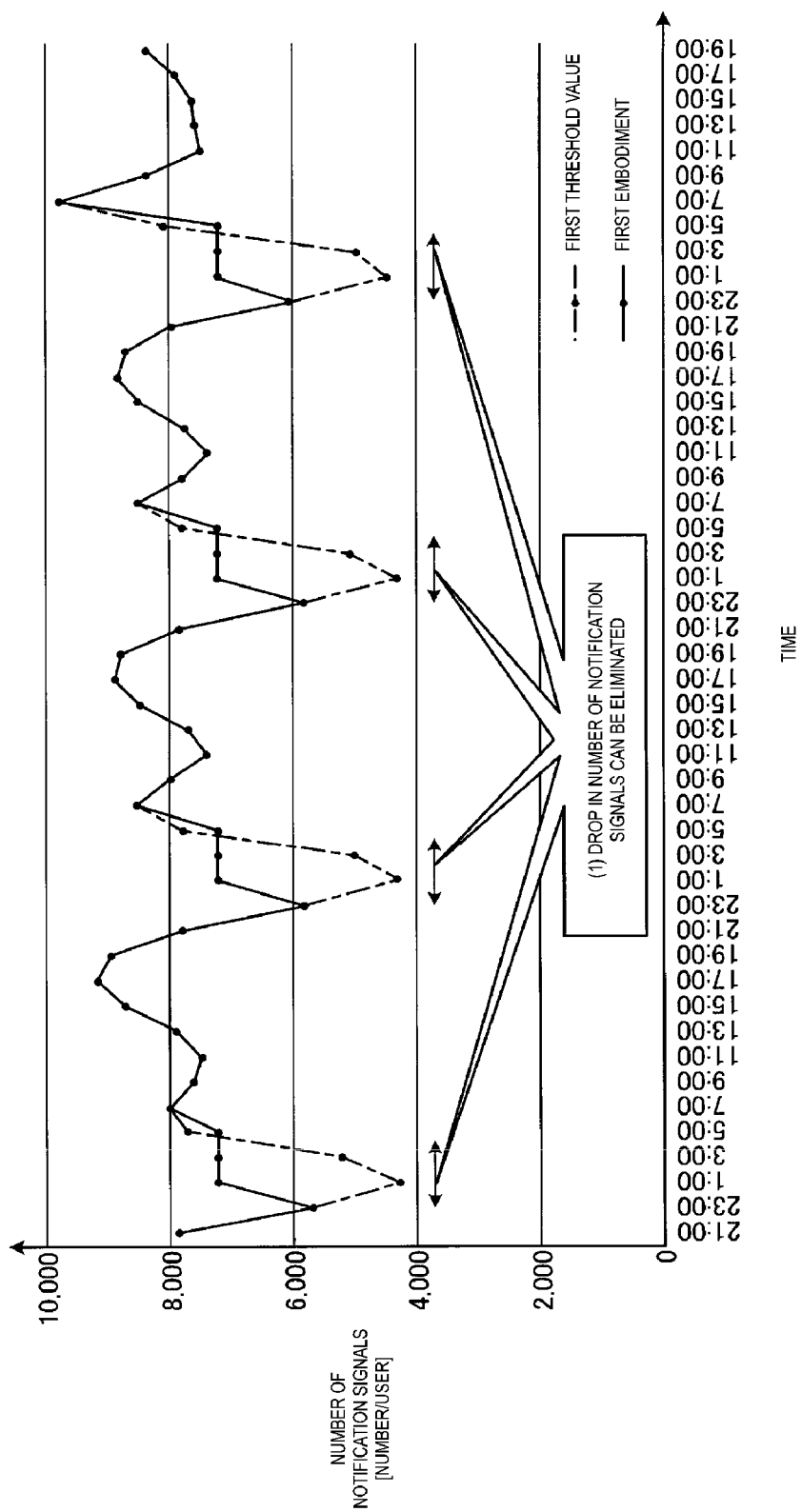
FIG. 10 is a graph illustrating a time dependence of the number of notification signals from the relay device when each communication amount threshold value is employed.

FIGS. 9 and 10 are graphs each illustrating a time dependence of the number of notification signals from the relay device 10 when each communication amount threshold value is employed. In FIG. 9, a curve M1 indicates a case where the first threshold value Y is employed as the communication amount threshold value, a curve M2 indicates a case where the second threshold value X is employed as the communication amount threshold value, and a curve M3 indicates a case where the communication amount threshold value set by using the scheme of the first embodiment is employed.

A period T1 of FIG. 9 is a period in which the first threshold value Y is set because of the relationship X>Y (see (1) of FIG. 9). The period T1 is a time slot in which the amount of communication increases. The first threshold value Y which is the multiplication value of the communication speed and the target value of the notification period, the amount of communication of which is notified from the relay device 10, is employed, and thus, the policy control device 20 can acquire statistical information (number of notification signals) in which the number of signals is suppressed. Meanwhile, a period T2 is a period in which the second threshold value X is set because of the relationship X≤Y (see (2) of FIG. 9). The period T2 is a time slot in which the amount of communication is small. The number of times of notifying a signal amount can be maintained at a fixed value, and thus, the policy control device 20 can acquire a fixed number of pieces of statistical information (number of notification signals).

As described above, the policy control device 20 dynamically sets the communication amount threshold value for the relay device 10. Accordingly, it is possible to eliminate a drop in the number of notification signals from the relay device 10 even in a time slot in which the amount of user communication greatly decreases (see (1) of FIG. 10). The policy control device 20 can appropriately acquire statistical information while suppressing the number of notification signals from the relay device 10 even in a time slot in which the amount of user communication increases.

Operation of Communication System

Figure 11:
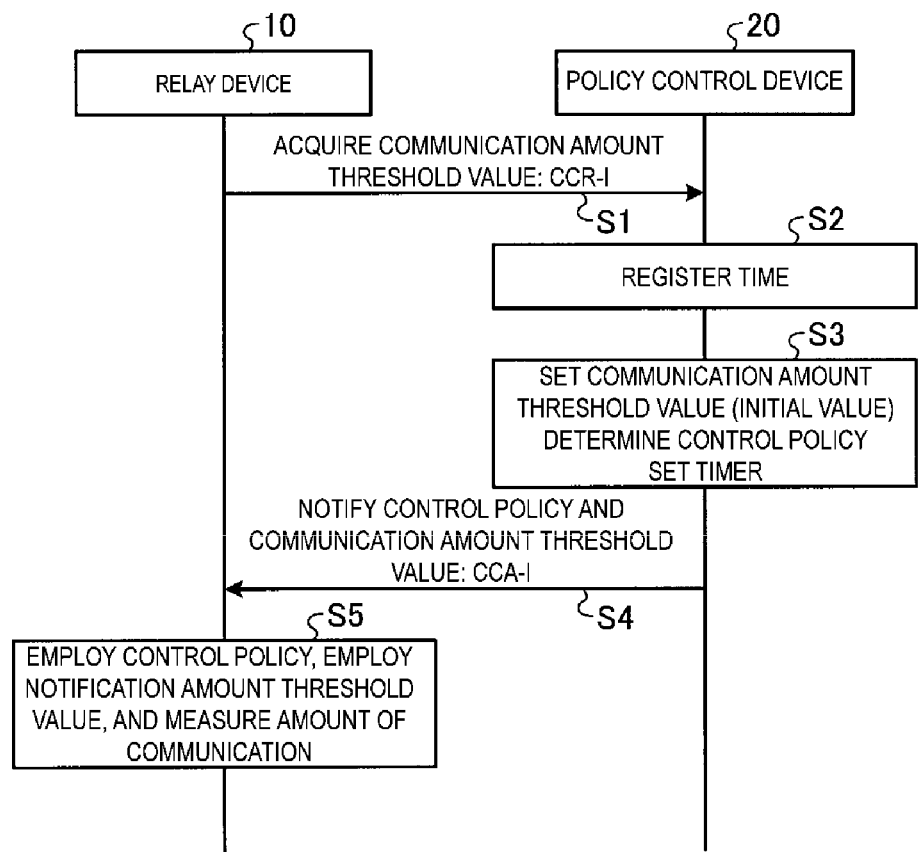
FIG. 11 is a sequence diagram illustrating an operation of a communication system.
Figure 12:
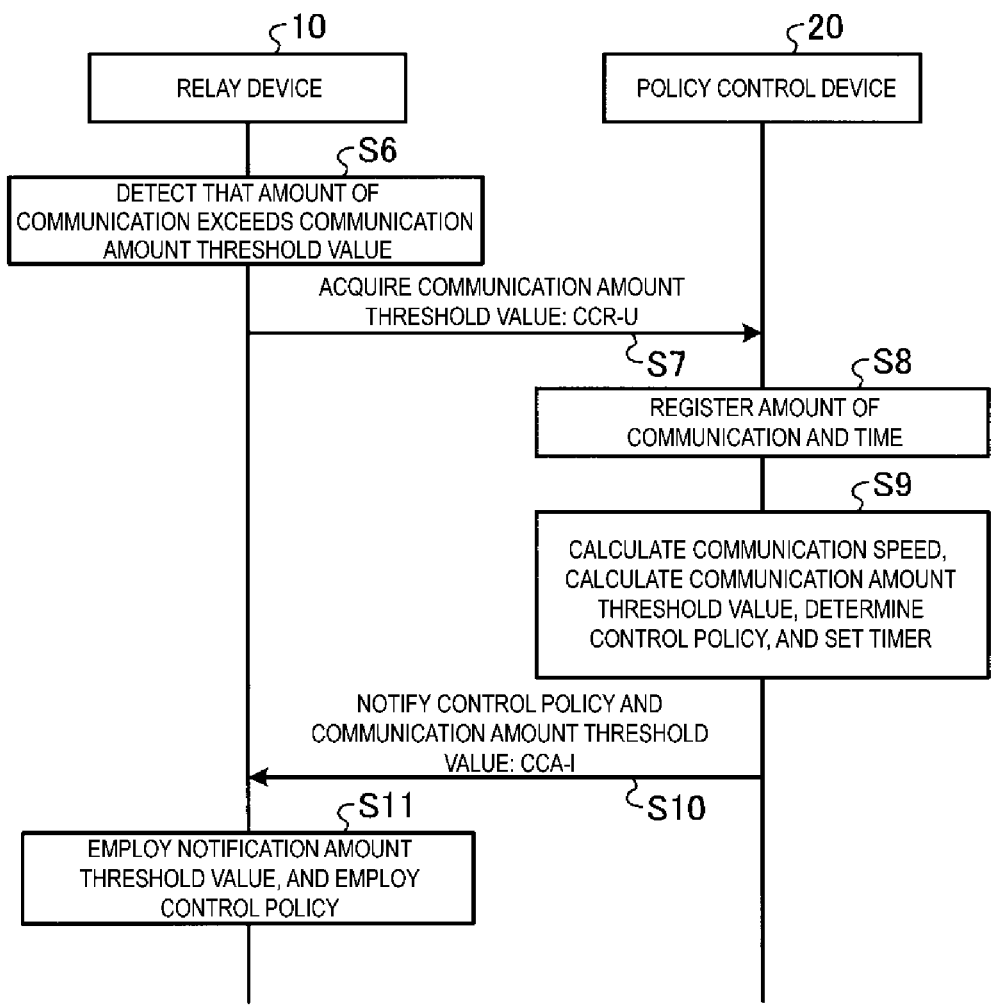
FIG. 12 is a sequence diagram illustrating an operation of the communication system.
Figure 13:
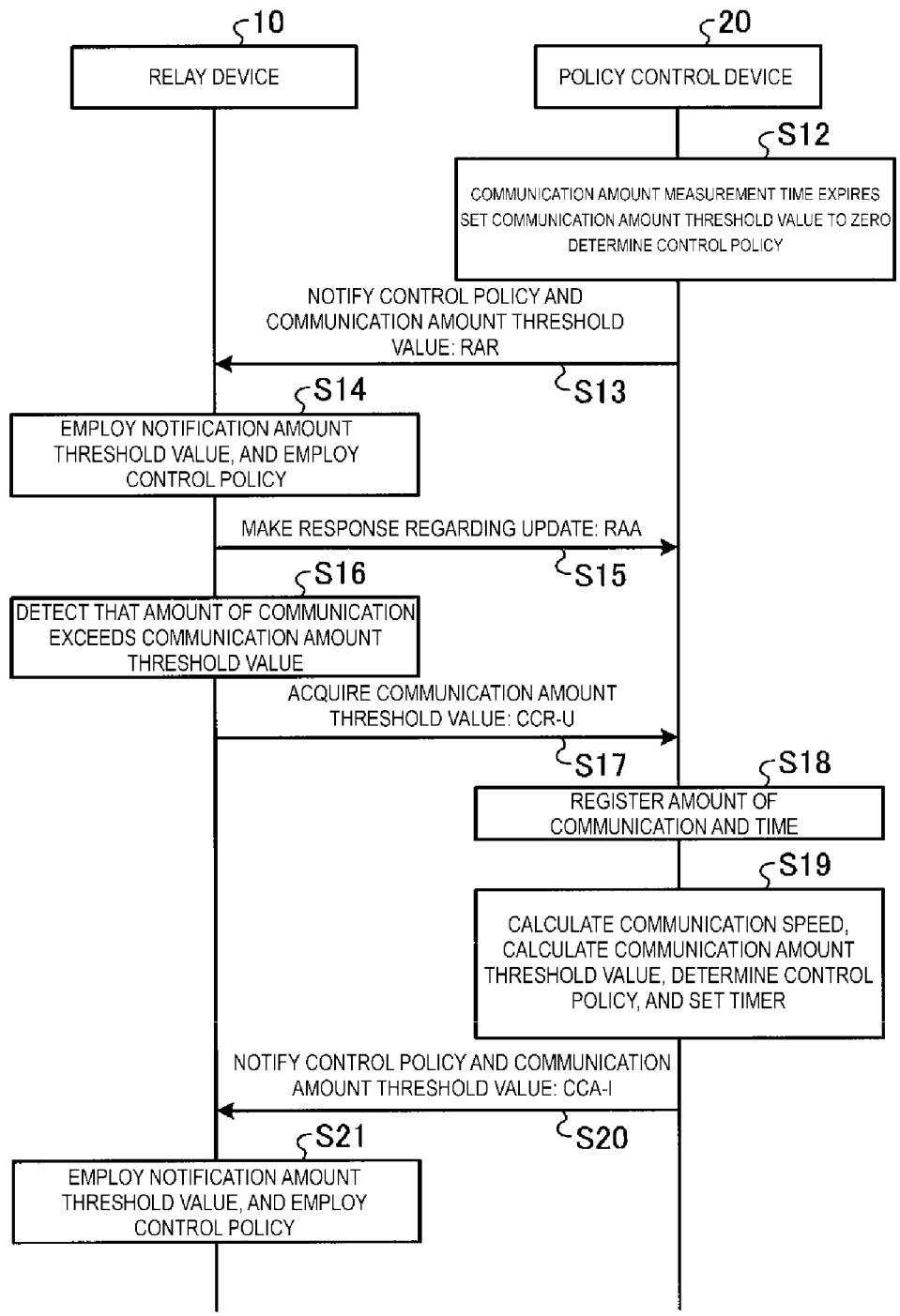
FIG. 13 is a sequence diagram illustrating an operation of the communication system.

FIGS. 11 to 13 are sequence diagrams illustrating operations of the communication system. First, with reference to FIG. 11, an operation will be described in which the relay device 10 newly request acquisition of the communication amount threshold value for the user terminal 40 from the policy control device 20, acquires an initial value of the communication amount threshold value, and employs the acquired initial value.

First, the relay device 10 requests acquisition of the communication amount threshold value to be employed for the user terminal 40 by using a Credit Control Request-Initial (CCR-I) command (step S1). The policy control device 20 registers a time at which the CCR-I command is received in the communication amount management table 221 (step S2).

In the policy control device 20, the calculation unit 232 sets a preset initial value as the communication amount threshold value. The policy determination unit 235 determines the control policy corresponding to the amount of communication of the user terminal 40, that is, the initial value of zero while referring to the communication amount management table 221 and the control policy 224. The timer management unit 234 sets a timer for monitoring notification of the amount of communication (step S3).

The policy control device 20 notifies the relay device 10 of the initial value of the communication amount threshold value and the control policy via the communication control unit 21 (step S4). The relay device 10 employs the notified communication amount threshold value and control policy, and starts measuring the amount of communication of the user terminal 40 (step S5).

Next, with reference to FIG. 12, an operation will be described in which the relay device 10 notifies the policy control device 20 of the amount of communication of the user terminal 40 and employs the communication amount threshold value notified from the policy control device 20.

In the relay device 10, when the communication amount management unit 12 detects that the amount of communication of the user terminal 40 exceeds the communication amount threshold value (step S6), the communication amount notification unit 13 notifies the amount of communication to the policy control device 20 via the communication control unit 11 by using a Credit Control Request-Update (CCR-U) command (step S7). In the policy control device 20, the acquisition unit 23a registers the time at which the CCR-U command is received and the amount of communication of the user terminal 40 in the communication amount management table 221 (step S8).

In the policy control device 20, the calculation unit 232 calculates the communication speed s and the first threshold value Y, reads the second threshold value X, and sets the communication amount threshold value. The policy determination unit 235 determines the control policy corresponding to the notified amount of communication of the user terminal 40. The timer management unit 234 sets the timer for monitoring notification of the amount of communication (step S9).

The policy control device 20 notifies the relay device 10 of the communication amount threshold value and the control policy via the communication control unit 21 by using a Credit Control Answer-Update (CCA-U) command (step S10). The relay device 10 employs the notified communication amount threshold value and control policy (step S11).

Next, with reference to FIG. 13, a description will be given to an operation of acquiring the amount of communication of the user terminal 40 by push notification, updating the communication amount threshold value, and notifying the relay device 10 of the updated communication amount threshold value when the timer set by the policy control device 20 expires.

In the policy control device 20, when detecting that the timer expires, the timer management unit 234 sets the communication amount threshold value to zero. The policy determination unit 235 determines the control policy corresponding to the amount of communication while referring to the communication amount management table 221 and the control policy 224 (step S12).

The policy control device 20 notifies the relay device 10 of the communication amount threshold value set to zero and the control policy via the communication control unit 21 by using a Re Auth Request (RAR) command (step S13). The relay device 10 employs the notified communication amount threshold value and control policy (step S14), and provides, to the policy control device 20, a response indicating that the communication amount threshold value and the control policy have been updated via the communication control unit 11 by using a Re Auth Answer (RAA) command (step S15).

In the relay device 10, the communication amount management unit 12 immediately determines that the amount of communication of the user terminal 40 exceeds the communication amount threshold value set to zero (step S16). The communication amount notification unit 13 notifies the policy control device 20 of the amount of communication via the communication control unit 11 by using the CCR-U command (step S17). The policy control device 20 registers the time at which the CCR-U command is received and the amount of communication of the user terminal 40 in the communication amount management table 221 (step S18).

In the policy control device 20, the calculation unit 232 calculates the communication speed s and the first threshold value Y, reads the second threshold value X, and sets the communication amount threshold value. The policy determination unit 235 determines the control policy corresponding to the notified amount of communication of the user terminal 40. The timer management unit 234 sets the timer for monitoring notification of the amount of communication (step S19).

In the policy control device 20, the notification unit 23c notifies the relay device 10 of the communication amount threshold value and the control policy via the communication control unit 21 by using the CCA-U command (step S20). The relay device 10 employs the notified communication amount threshold value and control policy (step S21).

Notification Processing

Figure 14:
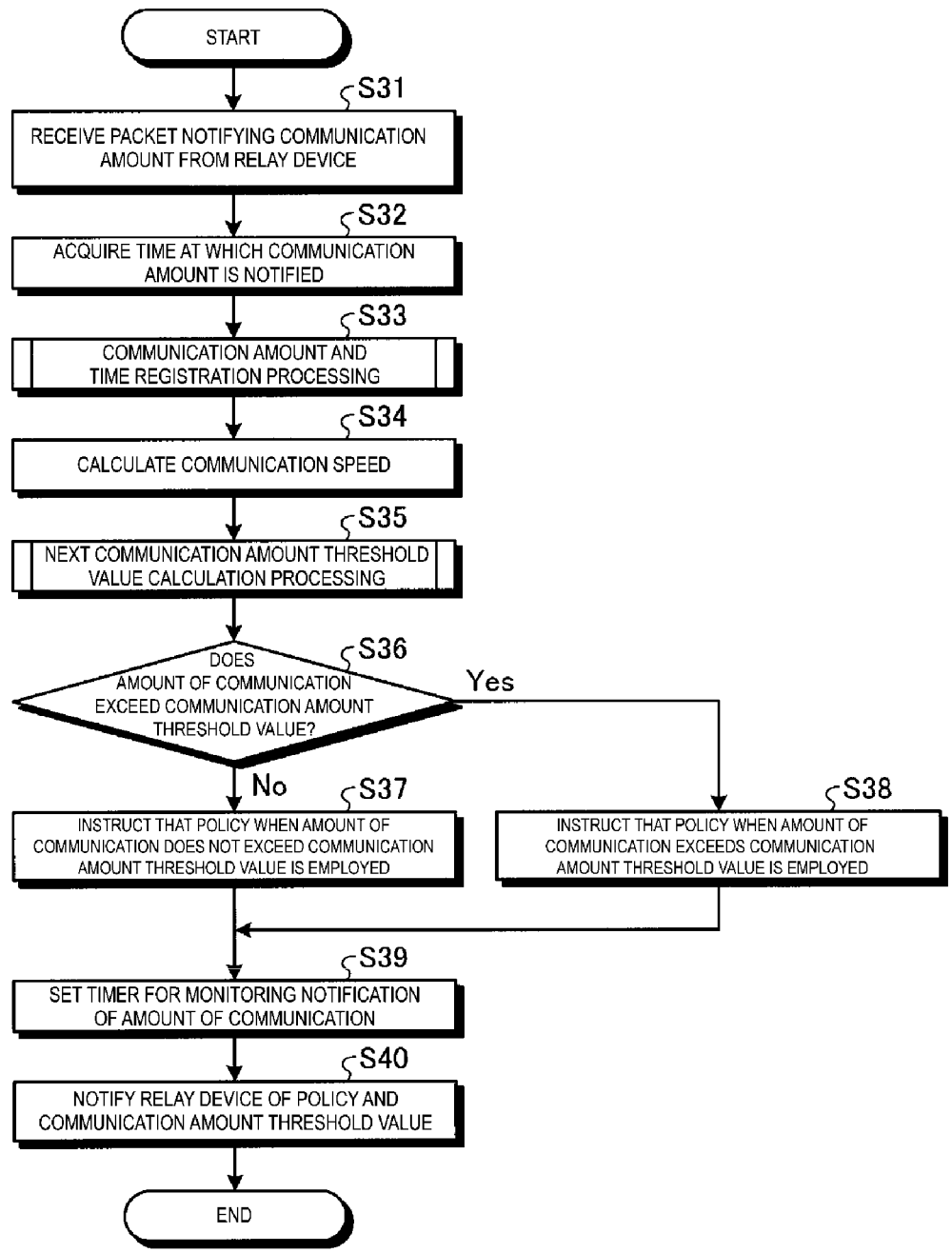
FIG. 14 is a flowchart illustrating a processing procedure of a communication method according to the first embodiment.

Next, processing of notifying the communication amount threshold value by the policy control device 20 will be described with reference to FIG. 14. FIG. 14 is a flowchart illustrating a processing procedure of a communication method according to the first embodiment. For example, the flowchart illustrated in FIG. 14 is started at a timing at which a packet is received from the relay device 10.

Upon receipt of the packet notifying the amount of communication of the user terminal 40 from the relay device 10 (step S31), the policy control device 20 acquires the time at which the amount of communication is notified (step S32), and performs communication amount and time registration processing of registering at least the amount of communication and the time in the storage unit 22 (step S33).

The calculation unit 232 calculates the communication speed s by using the notified amount of communication (step S34), calculates the first threshold value Y by using the calculated communication speed s, compares the calculated first threshold value Y with the second threshold value X read from the storage unit 22, and performs communication amount threshold value calculation processing of calculating the communication amount threshold value of the next period (step S35).

The policy determination unit 235 determines whether the amount of communication exceeds the communication amount threshold value while referring to the communication amount management table 221 (step S36). When the amount of communication does not exceed the communication amount threshold value (step S36: No), the policy determination unit 235 determines an unregulated control policy (step S37). Meanwhile, when the amount of communication exceeds the communication amount threshold value (step S36: Yes), the policy determination unit 235 determines the control policy for performing bandwidth control depending on the amount of communication (step S38).

The timer management unit 234 sets the timer for monitoring notification of the amount of communication of the user terminal 40 (step S39), and the notification unit 233 notifies the relay device 10 of the determined control policy and the calculated communication amount threshold value (step S40). Accordingly, a series of notification processing is ended.

Figure 15:
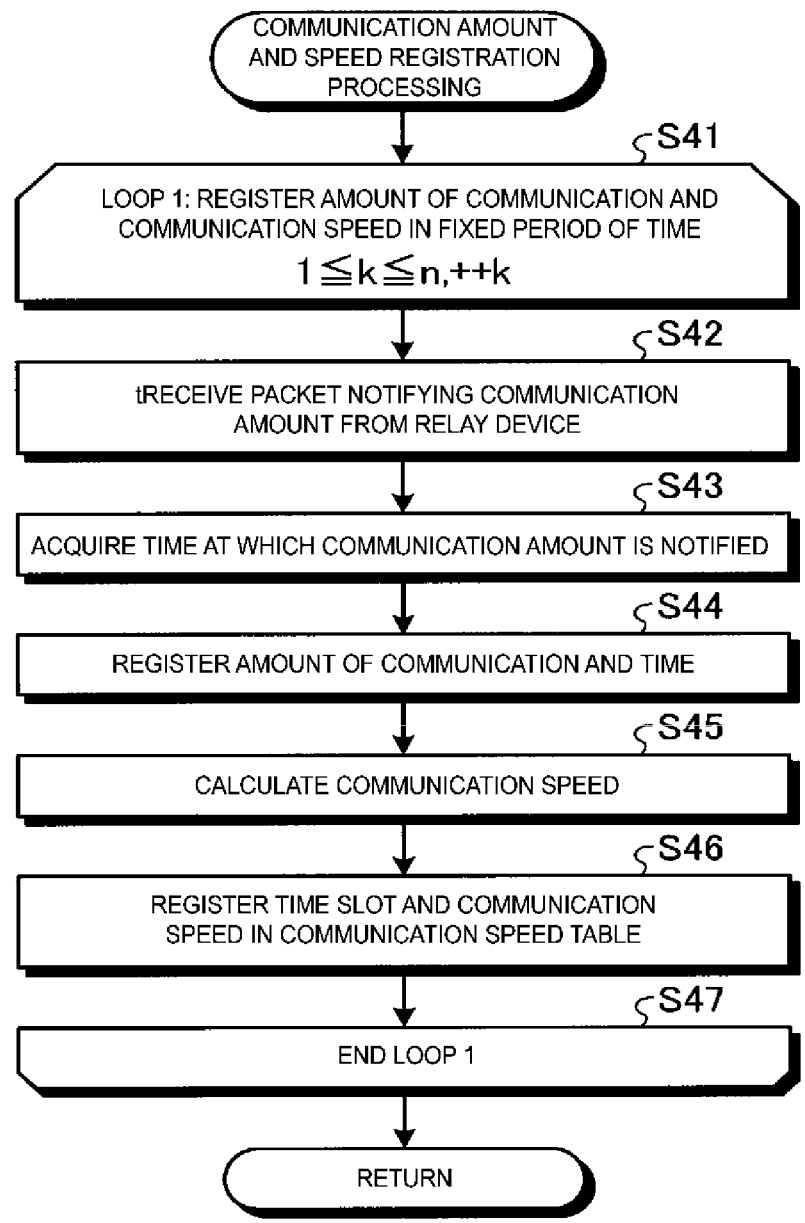
FIG. 15 is a diagram illustrating a processing procedure of registration and time registration processing illustrated in FIG. 14.

Procedure of Communication Amount and Time Registration Processing Next, a procedure of registration and time registration processing (step S33 of FIG. 14) will be described. FIG. 15 is a diagram illustrating the procedure of the registration and time registration processing illustrated in FIG. 14. As illustrated in FIG. 15, the acquisition unit 231 repeats processing of a loop 1 to register the amount of communication in a fixed period of time and the time. Here, steps S41 to S47 are performed for each period k (1≤k≤n). First, the acquisition unit 231 initializes k, and receives a packet notifying the amount of communication from the relay device 10 (step S42).

Subsequently, the acquisition unit 231 acquires the time at which the amount of communication is notified (step S43). The acquisition unit 231 registers the acquired amount of communication and time in the communication amount management table 221 in association with the identifier of the user terminal (step S44). Subsequently, the calculation unit 232 calculates the communication speed (step S45), and registers a time slot, the communication speed of which is calculated, and the communication speed in the communication speed table 222 (step S46). The registration processing in this loop is ended (step S47). Thus, one is added to n, and the processing of step S42 to step S46 is executed. The processing of steps S41 to S47 is executed until k is n.

Figure 16:
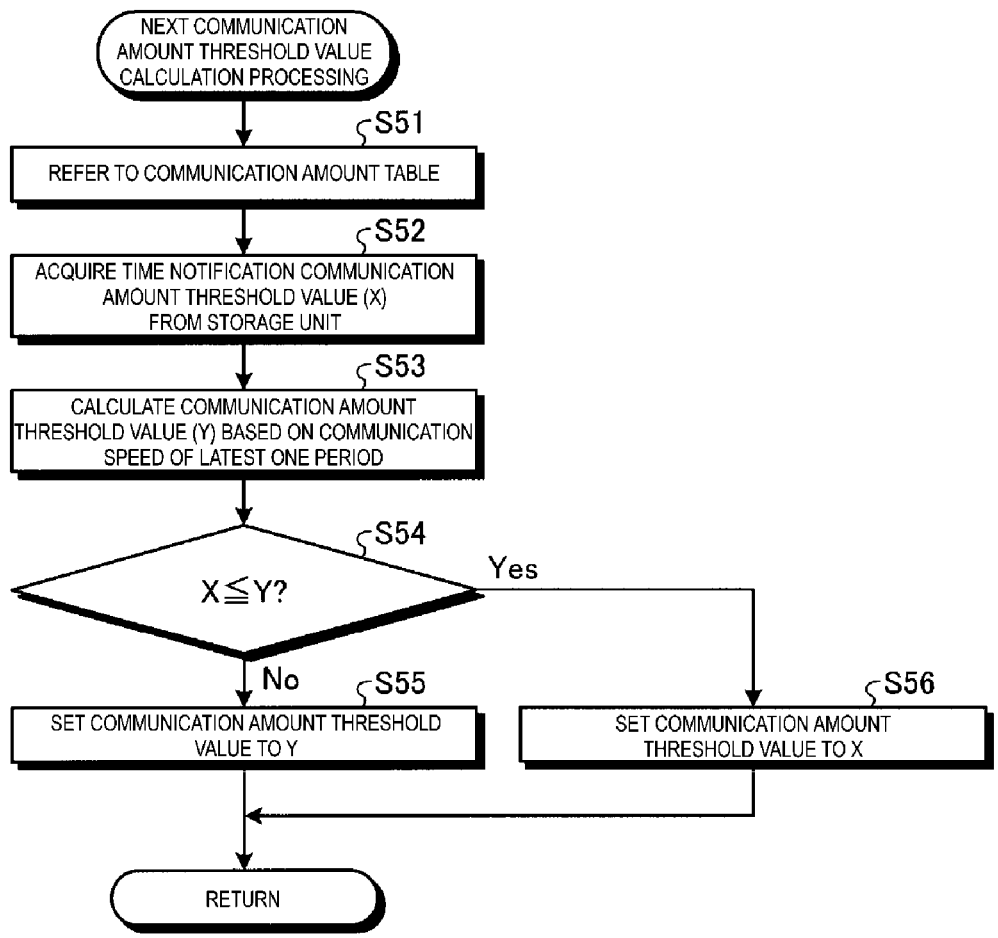
FIG. 16 is a diagram illustrating a processing procedure of next communication amount threshold value calculation processing illustrated in FIG. 15.

Procedure of Next Communication Amount Threshold Value Calculation Processing Next, a procedure of next communication amount threshold value calculation processing (step S35 in FIG. 14) will be described. FIG. 16 is a diagram illustrating the procedure of the next communication amount threshold value calculation processing illustrated in FIG. 15. As illustrated in FIG. 16, the calculation unit 232 refers to the communication amount management table 221 (step S51), and acquires the time notification communication amount threshold value 223 (second threshold value X) from the storage unit 22 (step S52). The calculation unit 232 calculates the communication amount threshold value (first threshold value Y) based on the communication speed of one latest period (step S53).

The calculation unit 232 compares the first threshold value Y and the second threshold value X, and determines whether a relationship of X≤Y is satisfied (step S54). When it is determined that the relationship of X≤Y is not satisfied, that is, a relationship of X>Y is satisfied (step S54: No), the calculation unit 232 sets the communication amount threshold value to Y (step S55), and ends the processing. Meanwhile, when it is determined that the relationship of X≤Y is satisfied (step S54: Yes), the calculation unit 232 sets the communication amount threshold value to X (step S56), and ends the processing.

Figure 17:
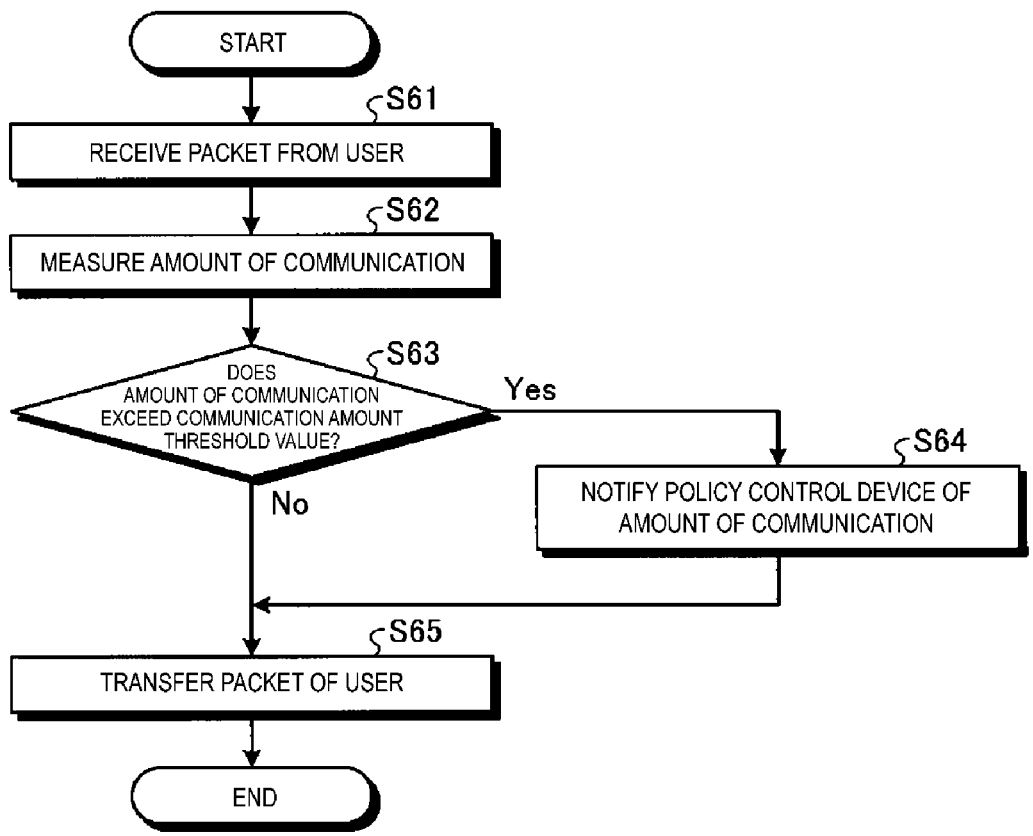
FIG. 17 is a flowchart illustrating a processing procedure of the relay device.

Processing Procedure in Relay Device Next, processing of the relay device 10 after the communication amount threshold value is notified from the policy control device 20 will be described with reference to FIG. 17. FIG. 17 is a flowchart illustrating a processing procedure of the relay device 10. For example, the flowchart illustrated in FIG. 17 is started at a timing at which a packet is received from the user terminal 40.

In the relay device 10, the communication amount management unit 12 receives the packet from the user terminal 40 (step S61), and measures the amount of communication (step S62). The communication amount management unit 12 determines whether the amount of communication exceeds the employed communication amount threshold value (step S63).

When the amount of communication exceeds the communication amount threshold value (step S63: Yes), the communication amount notification unit 13 notifies the policy control device 20 of the amount of communication (step S64), and the routing unit 14 transfers the packet from the user terminal 40 to a next hop (step S65). Meanwhile, when the amount of communication does not exceed the communication amount threshold value (step S63: No), the processing proceeds to step S65.

Effects of First Embodiment

As described above, the policy control device 20 according to the first embodiment calculates the communication amount threshold value based on the amount of communication in a past fixed period of time including the currently acquired amount of communication and notifies the relay device 10 of the calculated communication amount threshold value, thereby setting the communication amount threshold value. At this time, the policy control device 20 calculates the communication speed of the latest period, and sets, as the communication amount threshold value, a smaller threshold value of the first threshold value or the second threshold value. Here, the first threshold value is the multiplication value of the communication speed and the target value of the notification period, the amount of communication of which is notified from the relay device 10, and the second threshold value is the amount of communication when the notification amount of communication is notified at fixed intervals.

That is, in the case of the period in which the amount of communication increases, the policy control device 20 sets the first threshold value Y based on the communication speed in the latest period, and acquires the statistical information (number of notification signals) in which the number of signals is suppressed. The policy control device 20 can acquire the number of notification signals in a range that does not exceed the processing capacities of the policy control device 20 and the relay device 10. Meanwhile, the policy control device 20 sets the second threshold value X for the period in which the amount of communication is small such that the number of times of notifying the signal amount can be maintained at a fixed value, and acquires a fixed number of pieces of statistical information (number of notification signals) at an appropriate time.

As described above, the policy control device 20 dynamically sets the communication amount threshold value to the relay device 10, thereby appropriately acquiring the statistical information while suppressing the number of notification signals from the relay device 10 even in the time slot in which the amount of user communication increases, and eliminating the drop in the number of notification signals from the relay device 10 even in the time slot in which the amount of communication greatly decreases.

Thus, according to the first embodiment, the policy control device 20 can acquire an appropriate number of notification signals from the relay device that notifies the amount of communication of the user terminal regardless of an increase or decrease in the amount of communication of the user terminal.

Second Embodiment

Figure 18:
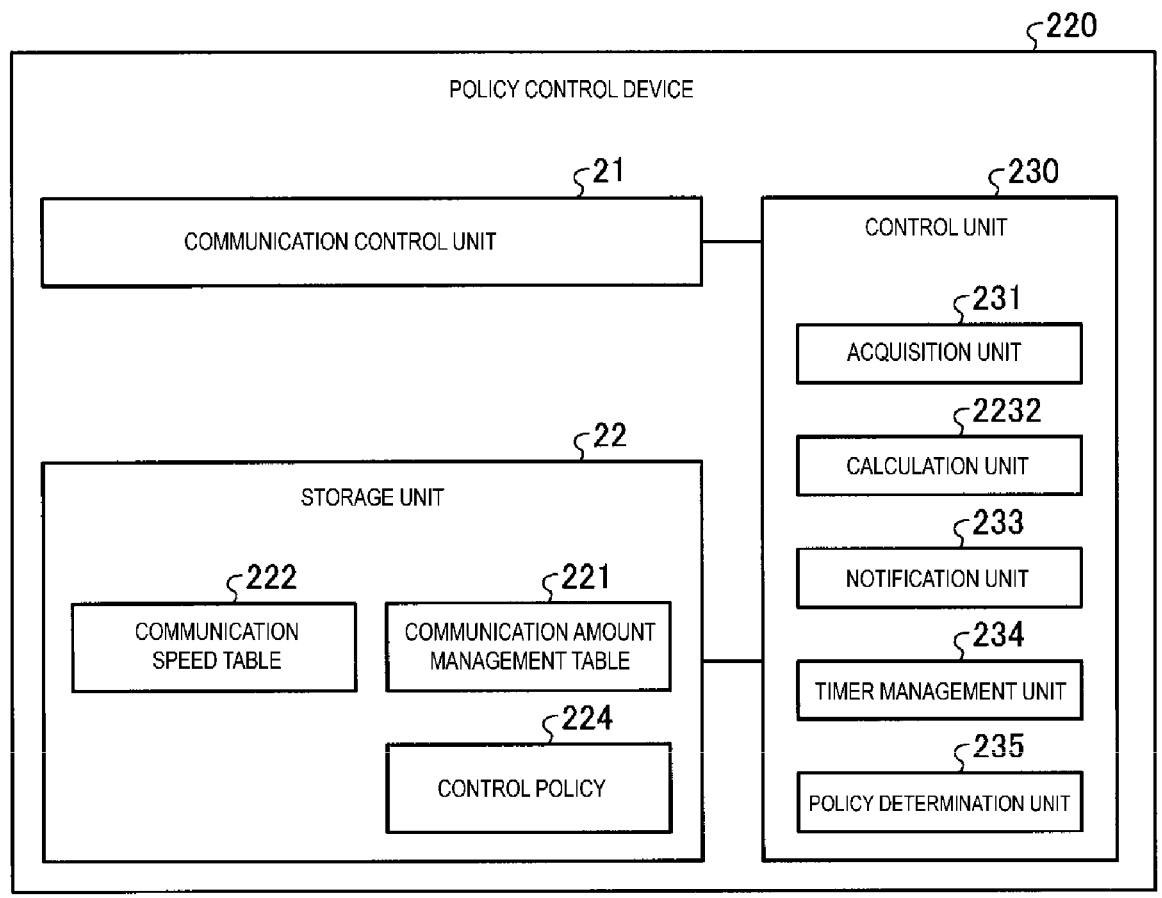
FIG. 18 is a diagram illustrating a schematic configuration of a policy control device according to a second embodiment.

Next, a second embodiment will be described. FIG. 18 is a diagram illustrating a schematic configuration of a policy control device according to the second embodiment.

As illustrated in FIG. 18, a policy control device 220 according to the second embodiment includes a control unit 230 having a function similar to that of the control unit 23 instead of the control unit 23 of the policy control device 20 illustrated in FIG. 2. In the second embodiment, it is not necessary to register the time notification communication amount threshold value 223 in the storage unit 22. The control unit 230 includes a calculation unit 2232.

The calculation unit 2232 calculates a communication amount threshold value by calculating a communication speed indicating a change in the amount of communication in each predetermined period based on the amount of communication in a past fixed period of time and performing weighting on each calculated communication speed using a weighted moving average or an exponentially moving average. Specifically, the calculation unit 2232 obtains a communication speed in each period, obtains an integrated value of a weight set for each period and the communication speed, and calculates a sum of the integrated values in all the periods as the communication amount threshold value.

Figure 19:
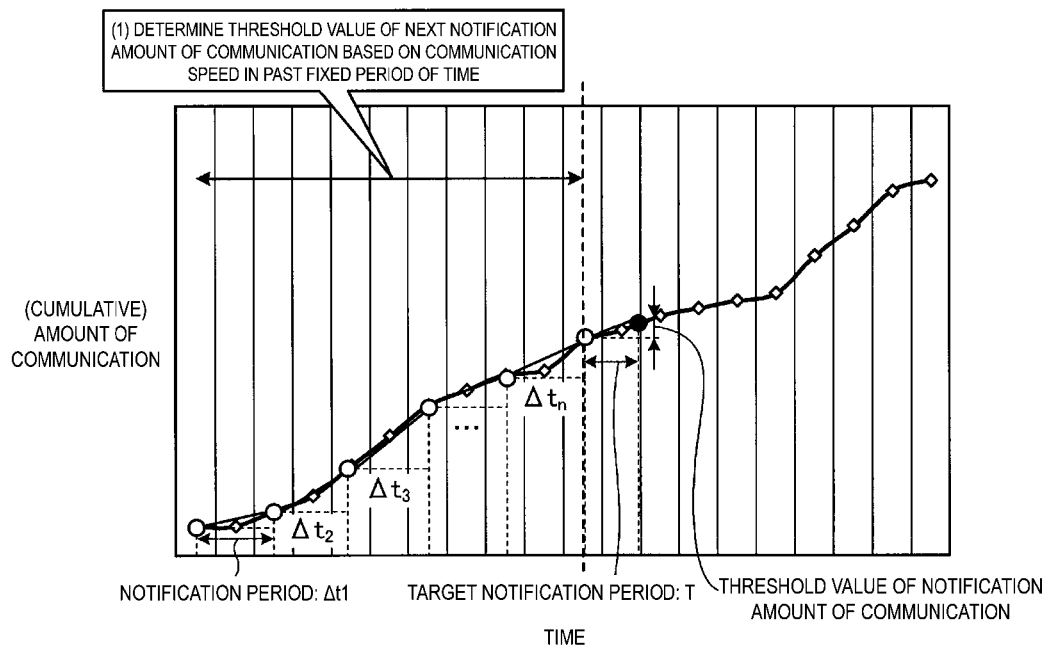
FIG. 19 is a graph illustrating a state in which a traffic volume of a certain user terminal changes over time.

Processing of Calculation Unit First, processing of calculating the communication amount threshold value by the calculation unit 2232 will be described. FIG. 19 is a graph illustrating a state in which a traffic volume of a certain user terminal 40 changes over time. The traffic volume means the accumulated amount of communication obtained by accumulating the amount of communication after a measurement for the user terminal 40 starts.

The calculation unit 2232 sets a threshold value (communication amount threshold value) of the notification amount of communication in the next period (a target notification period T) based on the communication speed in a past fixed period of time (see (1) of FIG. 19). At this time, the calculation unit 2232 sets the next communication amount threshold value by calculating the communication speed in each of periods $\Delta t_1$ to $\Delta t_n$, and performing weighting corresponding to each of the periods $\Delta t_1$ to $\Delta t_n$ on the communication speed of each period. As described above, the policy control device 220 determines the communication amount threshold value by taking account of the trend of the communication speed in the past fixed period of time in addition to the communication speed in the immediately previous period. Accordingly, the policy control device 220 can acquire an appropriate number of notification signals from the relay device that notifies the amount of communication of the user terminal regardless of an increase or decrease in the amount of communication of the user terminal.

First Processing Example

Figure 20:
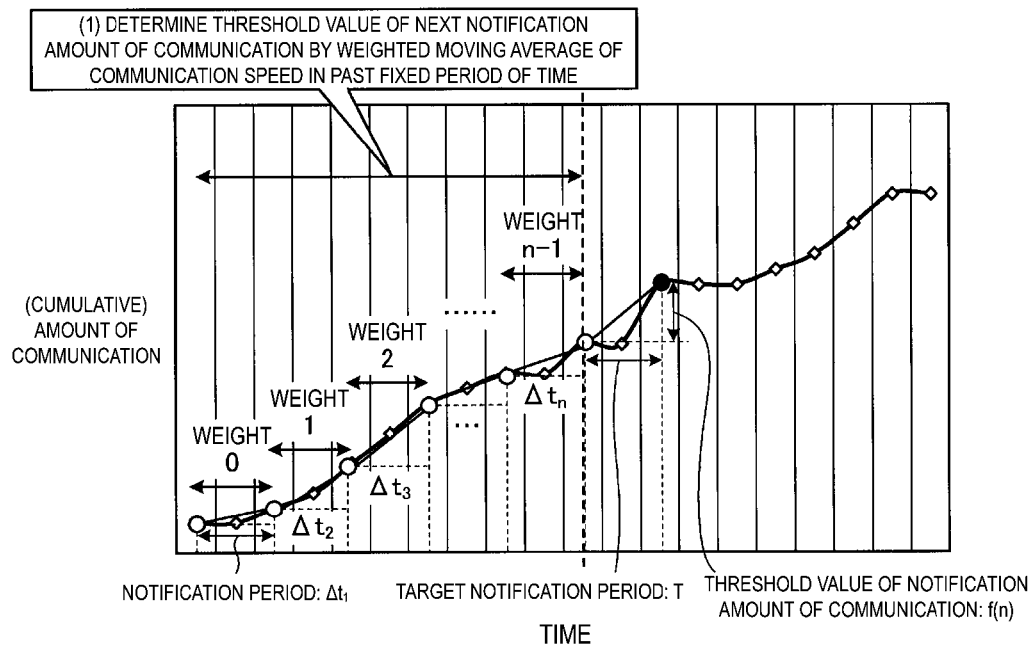
FIG. 20 is a graph illustrating a state in which a traffic volume of a certain user terminal changes over time.
Figure 21:
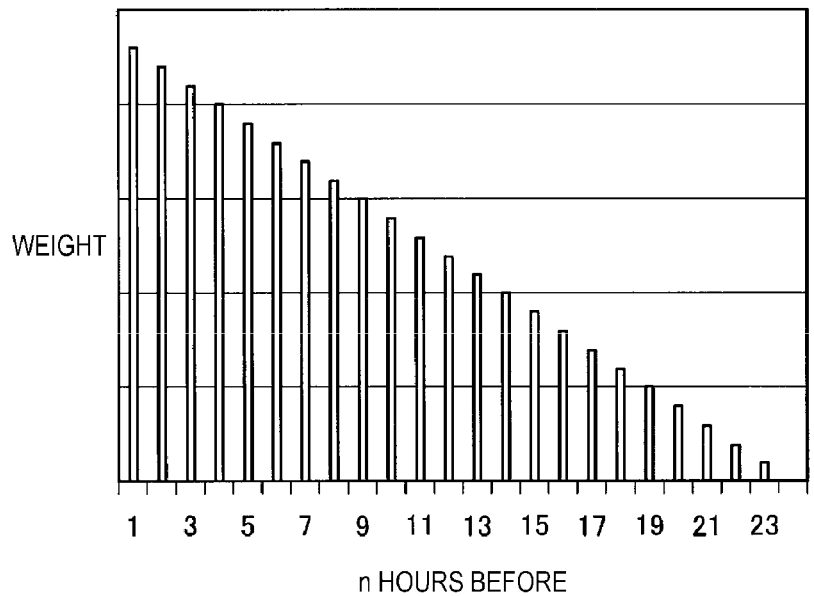
FIG. 21 is a graph illustrating a change in weight over time.

Here, an example of the processing of calculating the communication amount threshold value by the calculation unit 2232 will be described. FIG. 20 is a graph illustrating a state in which a traffic volume of a certain user terminal 40 changes over time. FIG. 21 is a graph illustrating a change in weight over time. As illustrated in FIGS. 20 and 21, the calculation unit 2232 uses the weighted moving average in which a weight decremented by a fixed amount is given to individual data (see (1) of FIG. 20). According to the weighted moving average, the calculation unit 2232 reduces weights for the amounts of communication in the past n times such that a weight of a time closest to the current time is set to n, a weight of the time previous to this closest time is set to n−1, and a time further previous to this previous time is set to n−2, and a weight is eventually set to zero.

The calculation unit 2232 calculates a communication amount threshold value f(n) by using Equation (2). $C_n$ is an increment in the amount of communication in the period $\Delta t_n$.

[Math. 2]

$$f(n) = \sum_{n=1}^{k} \frac{(n-k)C_n}{\Delta t_n} \quad (k = 1, 2, \ldots, n) \quad (2)$$

As described above, the calculation unit 2232 obtains, for each period, the integrated value of the weight set for each period and the communication speed, and calculates the sum of the integrated values as the communication amount threshold value.

Second Processing Example

Figure 22:
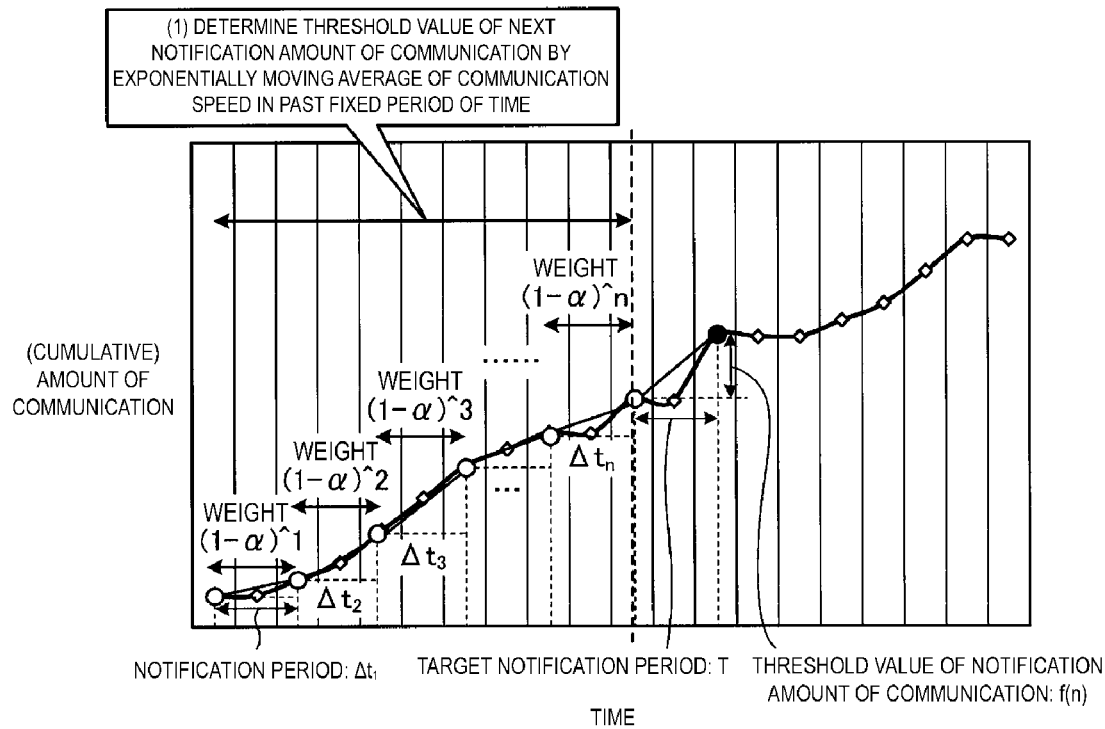
FIG. 22 is a graph illustrating a state in which a traffic volume of a certain user terminal changes over time.
Figure 23:
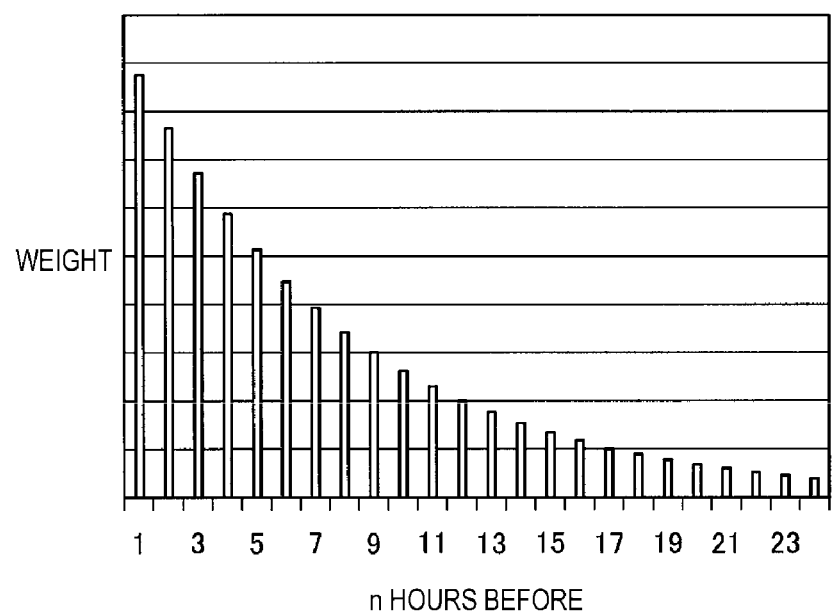
FIG. 23 is a graph illustrating a change in weight over time.

Next, another example of the processing of calculating the communication amount threshold value by the calculation unit 2232 will be described. FIG. 22 is a graph illustrating a state in which a traffic volume of a certain user terminal 40 changes over time. FIG. 23 is a graph illustrating a change in weight over time. As illustrated in FIGS. 22 and 23, the calculation unit 2232 uses the exponentially moving average in which an exponentially reduced weight is given to individual data (see (1) of FIG. 22). According to the exponentially moving average, the calculation unit 2232 reduces weights for the amounts of communication in the past n times such that a weight of a time closest to the current time is set to $(1-\alpha)^n$, a weight of a time previous to this closest time is set to $(1-\alpha)^{(n-1)}$, and a weight of a time further previous to this previous time is set to $(1-\alpha)^{(n-2)}$. The weight is not set to zero.

The calculation unit 2232 calculates a communication amount threshold value f(n) by using Equation (3). $C_n$ is an increment in the amount of communication in the period $\Delta t_n$.

[Math. 3]

$$f(n) = \sum_{n=1}^{k} \frac{(1-\alpha)^k C_n}{\Delta t_n} \quad \left(k = 1, 2, \ldots, n \quad \alpha = \frac{2}{n+1}\right) \quad (3)$$

Notification Processing

Figure 24:
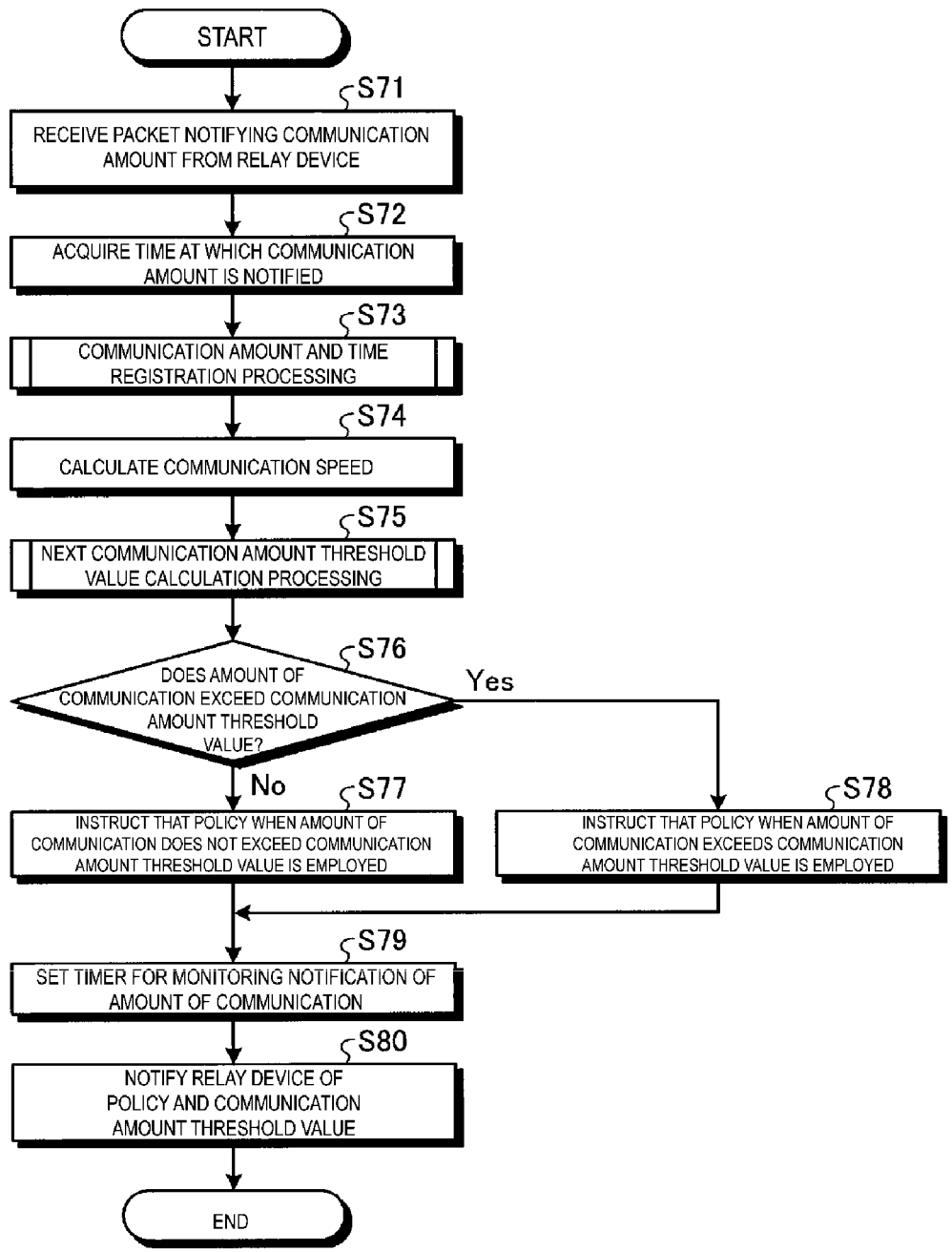
FIG. 24 is a flowchart illustrating a processing procedure of a communication method according to the second embodiment.

Next, processing of notifying the communication amount threshold value by the policy control device 220 will be described with reference to FIG. 24. FIG. 24 is a flowchart illustrating a processing procedure of a communication method according to the second embodiment. Steps S71 to S74 illustrated in FIG. 24 are processing identical to steps S31 to S34 illustrated in FIG. 14.

The calculation unit 232 performs next communication amount threshold value calculation processing of calculating the communication amount threshold value f(n) in the next period by performing weighting on the communication speed based on the weighted moving average or the exponentially moving average (step S75). Steps S76 to S80 are processing identical to steps S36 to S40 illustrated in FIG. 14.

Figure 25:
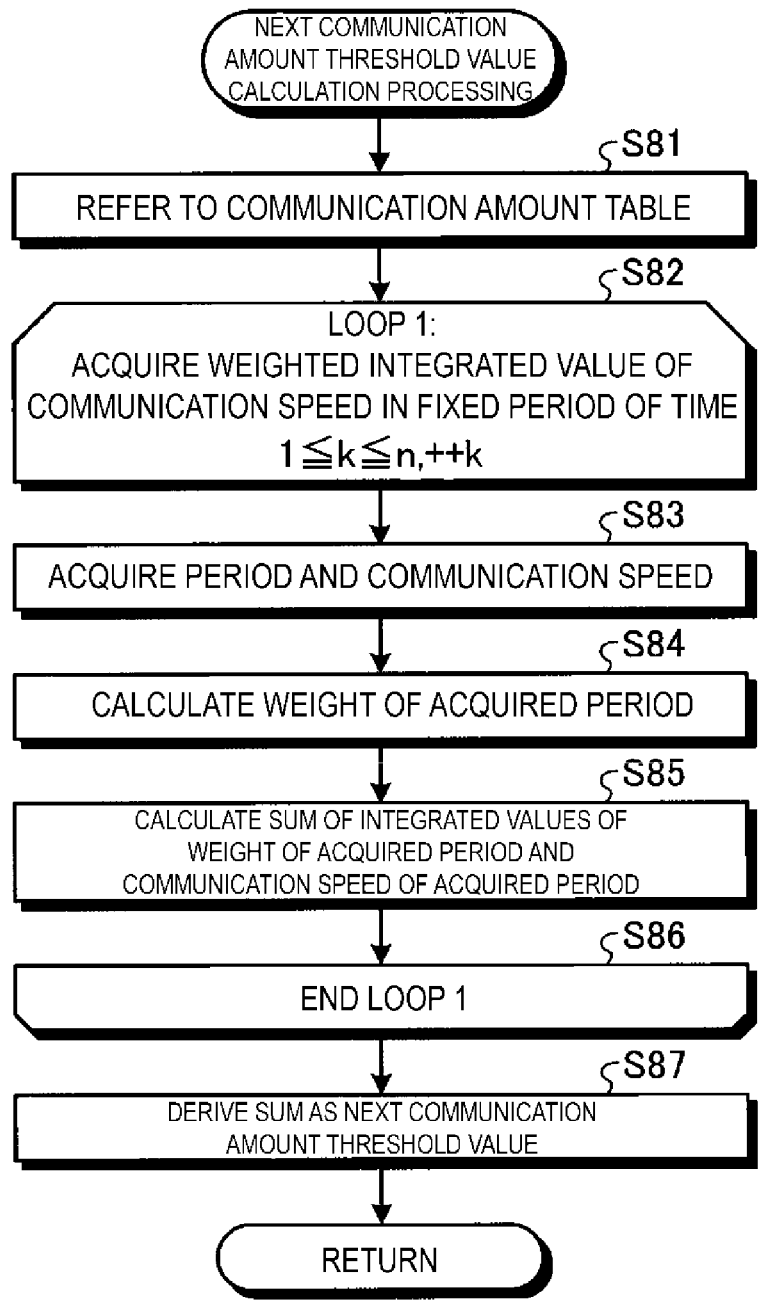
FIG. 25 is a diagram illustrating a processing procedure of next communication amount threshold value calculation processing illustrated in FIG. 24.

Procedure of Next Communication Amount Threshold Value Calculation Processing Next, a procedure of the next communication amount threshold value calculation processing (step S75 of FIG. 24) will be described. FIG. 25 is a diagram illustrating the procedure of the next communication amount threshold value calculation processing illustrated in FIG. 24. As illustrated in FIG. 25, the calculation unit 2232 refers to the communication amount management table 221 (step S81). The calculation unit 2232 repeats processing of a loop 1 to acquire the weighted integrated value of the communication speed in each period of a past fixed period of time. Here, the processing of steps S82 to S86 is performed for each period k (1≤k≤n).

First, the calculation unit 2232 acquires the period and the communication speed from the storage unit 22 (step S83), and calculates the weight of the acquired period (step S84).

The calculation unit 2232 calculates the weight by using the weighted moving average method or the exponentially moving average.

The calculation unit 2232 calculates the sum of the integrated values of the acquired weight of the period and the acquired communication speed of the period (step S85). The registration processing in this loop is ended by this processing (step S86). Thus, one is added to n, and the processing of steps S83 to S86 is executed. The processing of steps S82 to S86 is executed until k is n. The calculation unit 2232 derives the sum as the communication amount threshold value f(n) of the next period (step S87), and ends the processing.

Effects of Second Embodiment

As described above, in the second embodiment, the policy control device 220 calculates the communication amount threshold value by calculating the communication speed based on the amount of communication in the past fixed period of time and performing the weighting on the calculated communication speed using the weighted moving average or the exponentially moving average. Specifically, the policy control device 220 calculates the communication speed in each period, obtains, for each period, the integrated value of the weight set for each period and the communication speed, and calculates the sum of the obtained integrated values in all the periods as the communication amount threshold value.

As described above, the policy control device 220 dynamically determines the communication amount threshold value for the relay device 10 by taking account of the trend of the communication speed in the past fixed period of time. Accordingly, the policy control device 220 can acquire an appropriate number of notification signals from the relay device that notifies the amount of communication of the user terminal regardless of an increase or decrease in the amount of communication of the user terminal.

System Configuration of Embodiments

The components of the policy control devices 20 and 220 illustrated in FIGS. 4 and 18 are functional conceptual components, and do not necessarily need to be physically configured as illustrated in the drawings. That is, the specific form of distribution and integration of the functions of each of the policy control devices 20 and 220 is not limited to the illustrated form, and the entirety or a portion of the form can be configured by being functionally or physically distributed and integrated in any unit, depending on various loads, usage conditions, and the like.

All or a part of the processing performed in each of the policy control devices 20 and 220 may be implemented by a CPU or a program analyzed and executed by the CPU. The processing performed in each of the policy control devices 20 and 220 may be implemented as hardware by wired logic.

All or a part of the processing described as being automatically performed among the processing described in the embodiments may be manually performed. Alternatively, all or a part of the processing described as being manually performed may be automatically performed by a known method. In addition, information including the processing procedures, the control procedures, the specific names, and the various types of data, and various parameters described above and illustrated in the drawings can be appropriately modified unless otherwise specified.

Program

Figure 26:
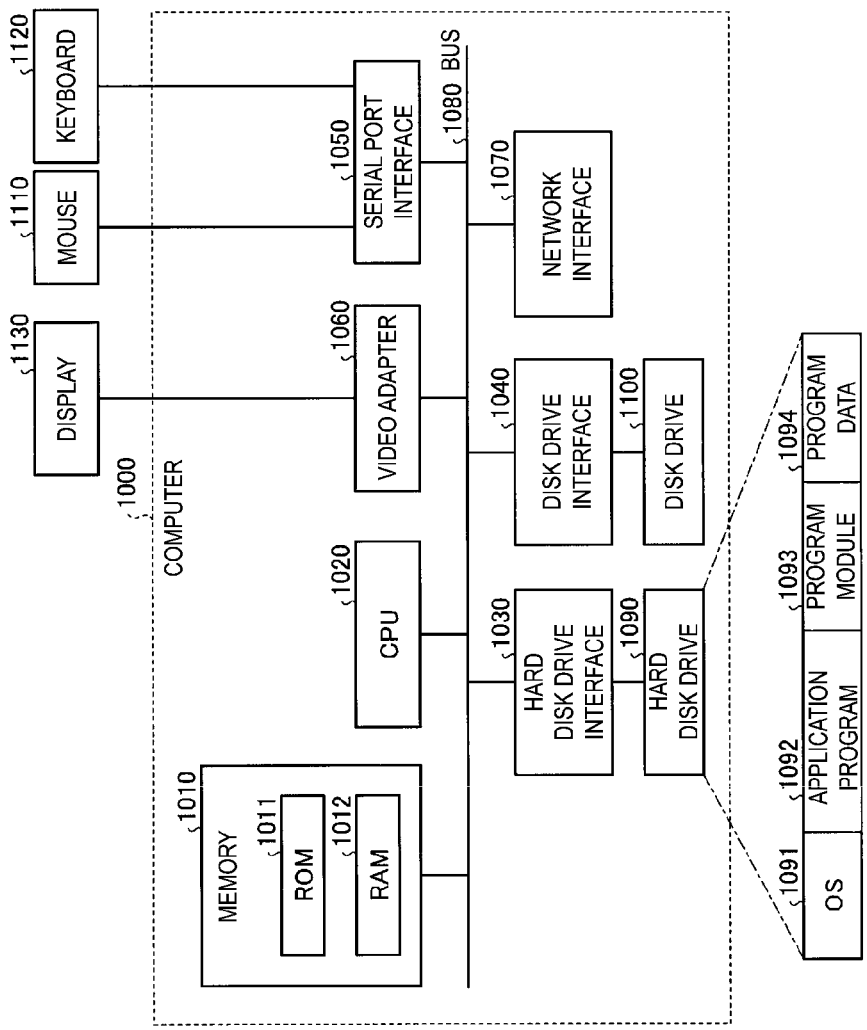
FIG. 26 is a diagram illustrating an example of a computer in which the policy control device is achieved by executing a program.
Figure 27:
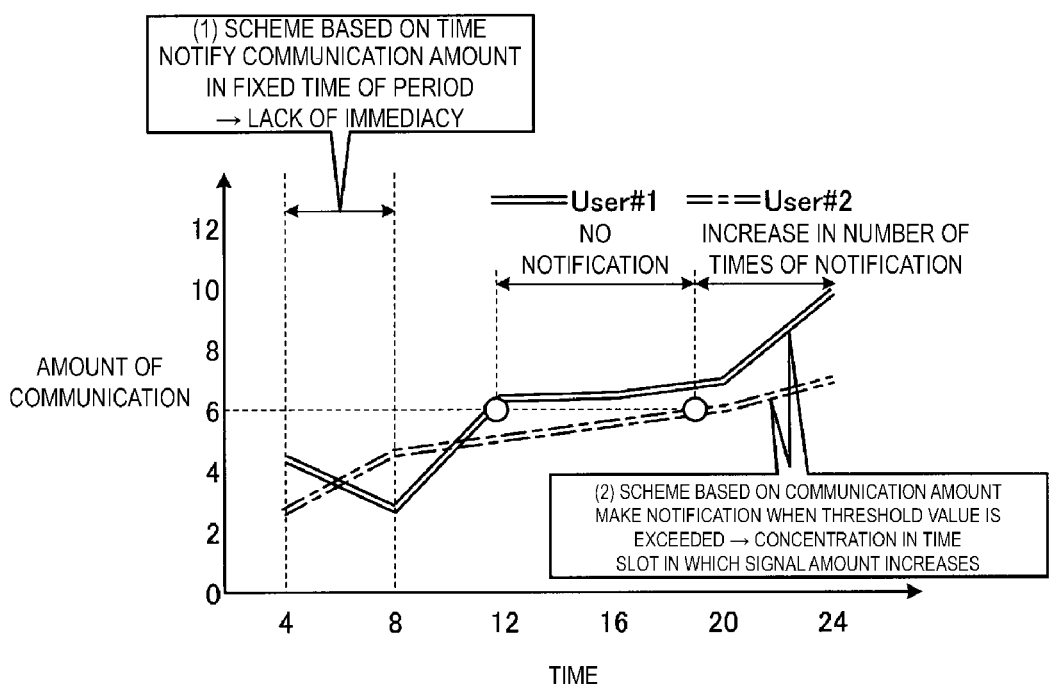
FIG. 27 is a graph illustrating a time dependence of the amount of communication.

FIG. 26 is a diagram illustrating an example of a computer for achieving the policy control devices 20 and 220 by executing a program. A computer 1000 includes, for example, a memory 1010 and a CPU 1020. The computer 1000 includes a hard disk drive interface 1030, a disk drive interface 1040, a serial port interface 1050, a video adapter 1060, and a network interface 1070. These units are connected by a bus 1080.

The memory 1010 includes a Read Only Memory (ROM) 1011 and a RAM 1012. The ROM 1011 stores a boot program, such as Basic Input Output System (BIOS), for example. The hard disk drive interface 1030 is connected to a hard disk drive 1090. The disk drive interface 1040 is connected to a disk drive 1100. A detachable storage medium such as a magnetic disk or an optical disc is inserted into the disk drive 1100. The serial port interface 1050 is connected, for example, to a mouse 1110 and a keyboard 1120. The video adapter 1060 is connected, for example, to a display 1130.

The hard disk drive 1090 stores, for example, an Operating System (OS) 1091, an application program 1092, a program module 1093, and program data 1094. That is, the program defining each processing of each of the policy control devices 20 and 220 is implemented as the program module 1093 in which codes executable by the computer 1000 are described. The program module 1093 is stored in, for example, the hard disk drive 1090. For example, the program module 1093 for executing processing similar to the functional configuration of each of the policy control devices 20 and 220 is stored in the hard disk drive 1090. Note that the hard disk drive 1090 may be replaced with a Solid State Drive (SSD).

Setting data used in the processing of the embodiments described above is stored as the program data 1094, for example, in the memory 1010 or the hard disk drive 1090. In addition, the CPU 1020 reads and executes the program module 1093 and the program data 1094 stored in the memory 1010 and the hard disk drive 1090 to the RAM 1012 as necessary.

Note that the program module 1093 and the program data 1094 are not limited to being stored in the hard disk drive 1090, and may be stored, for example, in a removable storage medium, and read by the CPU 1020 via the disk drive 1100 or its equivalent. Alternatively, the program module 1093 and the program data 1094 may be stored in another computer connected via a network (such as a LAN or a Wide Area Network (WAN)). In addition, the program module 1093 and the program data 1094 may be read by the CPU 1020 from another computer through the network interface 1070.

Although embodiments to which the invention made by the inventor is applied have been described, the present disclosure is not limited by the description and the drawings that form a part of the disclosure of the present invention according to the present embodiments. That is, other embodiments, examples, operation techniques, and the like that those skilled in the art implement based on the present embodiments are all included in the scope of the present invention.

REFERENCE SIGNS LIST

10 Relay device
11 Communication control unit
12 Communication amount management unit
13 Communication amount notification unit
14 Routing unit
15 Traffic control unit
20, 220 Policy control device 21 Communication control unit
22 Storage unit
221 Communication amount management table
222 Communication speed table
223 Time notification communication amount threshold value
224 Control policy
23, 230 Control unit
231 Acquisition unit
232, 2232 Calculation unit
233 Notification unit
234 Timer management unit
235 Policy determination unit
30 Electrical communication line
40 User terminal

The invention claimed is:

1. A control device comprising one or more processors configured to:
acquire a current amount of communication of an accommodated user terminal from a relay device that notifies the current amount of communication when the current amount of communication exceeds an initial communication amount threshold value;
calculate a communication speed by using (i) the current amount of communication acquired and (ii) a notification interval from a) a time at which a previous amount of communication is acquired to b) a time at which the current amount of communication is acquired;
calculate an updated communication amount threshold value based on the communication speed, wherein calculating the updated communication amount threshold value comprises:
determining a first threshold value that is a multiplication value of the communication speed and a target notification period, the target notification period being between (1) the time at which the current amount of communication is acquired and (2) a time at which an updated amount of communication is acquired,
obtaining a second threshold value that is a predetermined amount of communication when a notification from the relay device is received at a fixed interval,
determining a smaller threshold value of the first threshold value and the second threshold value, and
setting the smaller threshold value as the updated communication amount threshold value; and
notify the relay device of the updated communication amount threshold value.

2. The control device according to claim 1,
wherein the target notification period is set depending on processing performance of the control device.

3. The control device according to claim 1, configured to:
calculate the updated communication amount threshold value by calculating a plurality of communication speeds for a plurality of periods in a past fixed period of time by using amounts of communication in the plurality of periods, each one of the plurality of communication speeds indicating a change in a corresponding one of the amounts of communication, and
perform weighting on the each one of the plurality of communication speeds using a weighted moving average or an exponentially moving average.

4. The control device according to claim 3, configured to:
obtain the each one of the plurality of communication speeds in each period of the plurality of periods,
obtain, for the each period of the plurality of periods, an integrated value of a weight set for the each period of the plurality of periods and the each one of the plurality of communication speeds, and
calculate, as the updated communication amount threshold value, a sum of obtained integrated values of the plurality of periods.

5. A control method executed by a control device, the method comprising:
acquiring a current amount of communication of an accommodated user terminal from a relay device that notifies the current amount of communication when the current amount of communication exceeds an initial communication amount threshold value;
calculating a communication speed by using (i) the current amount of communication acquired and (ii) a notification interval from a) a time at which a previous amount of communication is acquired to b) a time at which the current amount of communication is acquired; calculating an updated communication amount threshold value based on the communication speed, wherein calculating the updated communication amount threshold value comprises:
determining a first threshold value that is a multiplication value of the communication speed and a target notification period, the target notification period being between (1) the time at which the current amount of communication is acquired and (2) a time at which an updated amount of communication is acquired,
obtaining a second threshold value that is a predetermined amount of communication when a notification from the relay device is received at a fixed interval,
determining a smaller threshold value of the first threshold value and the second threshold value, and
setting the smaller threshold value as the updated communication amount threshold value; and notifying the relay device of the updated communication amount threshold value.

6. The control method according to claim 5,
wherein calculating the updated communication amount threshold value comprises:
calculating a plurality of communication speeds for a plurality of periods in a past fixed period of time by using amounts of communication in the plurality of periods, each one of the plurality of communication speeds indicating a change in a corresponding one of the amounts of communication, and
performing weighting on the each one of the plurality of communication speeds using a weighted moving average or an exponentially moving average.

7. The control method according to claim 5,
wherein the target notification period is set depending on processing performance of the control device.

8. The control method according to claim 6, wherein the calculating comprises:
obtaining the each one of the plurality of communication speeds in each period of the plurality of periods,
obtaining, for the each period of the plurality of periods, an integrated value of a weight set for the each period of the plurality of periods and the each one of the plurality of communication speeds; and
calculating, as the updated communication amount threshold value, a sum of obtained integrated values of the plurality of periods.

* * * * *